(12) United States Patent
Momonoi et al.

(10) Patent No.: US 8,416,284 B2
(45) Date of Patent: Apr. 9, 2013

(54) STEREOSCOPIC IMAGE CAPTURING APPARATUS AND STEREOSCOPIC IMAGE CAPTURING SYSTEM

(75) Inventors: Yoshiharu Momonoi, Yokohama (JP); Yuki Iwanaka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 853 days.

(21) Appl. No.: 12/461,179

(22) Filed: Aug. 4, 2009

(65) Prior Publication Data

US 2010/0073463 A1 Mar. 25, 2010

(30) Foreign Application Priority Data

Sep. 25, 2008 (JP) ................................. 2008-245502

(51) Int. Cl.
*H04N 13/02* (2006.01)
(52) U.S. Cl. .......................................... 348/48; 396/325
(58) Field of Classification Search ........................ None
See application file for complete search history.

(56) References Cited

U.S. PATENT DOCUMENTS

| | | | | |
|---|---|---|---|---|
| 6,118,475 A | * | 9/2000 | Iijima et al. | 348/42 |
| 6,381,360 B1 | * | 4/2002 | Sogawa | 382/154 |
| 7,061,532 B2 | * | 6/2006 | Silverstein | 348/335 |
| 7,253,949 B2 | * | 8/2007 | Piontkowski | 359/380 |
| 2006/0125921 A1 | * | 6/2006 | Foote | 348/159 |
| 2006/0164509 A1 | * | 7/2006 | Marshall et al. | 348/42 |
| 2007/0097206 A1 | * | 5/2007 | Houvener et al. | 348/26 |
| 2008/0117290 A1 | * | 5/2008 | Mazza | 348/47 |

FOREIGN PATENT DOCUMENTS

| | | |
|---|---|---|
| JP | A-10-224820 | 8/1998 |
| JP | A-2006-304230 | 11/2006 |
| JP | A-2007-286521 | 11/2007 |

OTHER PUBLICATIONS

Background Art Information Sheet provided by applicants (Dec. 15, 2008) (1 page total).

* cited by examiner

*Primary Examiner* — Moustafa M Meky
*Assistant Examiner* — Clayton R Williams
(74) *Attorney, Agent, or Firm* — Posz Law Group, PLC

(57) ABSTRACT

A stereoscopic image capturing apparatus includes a first image acquisition unit including a first image formation lens unit forming an image of an object, and a first image sensor having a plurality of capturing pixels to receive the image formed by the first formation lens unit, and a second image acquisition unit including a second image formation lens unit forming a image of the object, a first lens array unit having a plurality of lenses to receive the image formed by the second image formation lens, and a second image sensor having a plurality of capturing pixels to receive the formed image through the first lens array unit. The second image acquisition unit is disposed at a distance in a horizontal direction from the first image acquisition unit when viewed from the object.

20 Claims, 24 Drawing Sheets

STEREOSCOPIC IMAGE CAPTURING APPARATUS AND STEREOSCOPIC IMAGE CAPTURING SYSTEM

CROSS-REFERENCE TO RELATED APPLICATION

This application is based upon and claims the benefit of priority from prior Japanese Patent Application No. 2008-245502 filed on Sep. 25, 2008 in Japan, the entire contents of which are incorporated herein by reference.

BACKGROUND OF THE INVENTION

1. Field of the Invention

The present invention relates to a stereoscopic image capturing apparatus and system for obtaining stereoscopic image information to be displayed on a display.

2. Related Art

A large number of cameras, movable cameras, or laser scans are used to acquire stereoscopic image information of an object having a depth. If a large number of cameras are used, then the picture quality is degraded by individual differences and installation precisions of respective cameras. In the movable cameras, dispersion among systems which drive the movable cameras poses a problem.

Therefore, a stereoscopic image capturing apparatus using stereo cameras is proposed (JP-A 10-224820). In the stereoscopic image capturing apparatus, multi-parallax image information is generated by performing interpolation.

Furthermore, a stereoscopic image capturing apparatus using a multi-camera array is proposed (JP-A 2007-286521). In the stereoscopic image capturing apparatus, it is not necessary to perform interpolation because a large number of cameras are used. Even if interpolation is performed, there is little degradation in the interpolated image because multi-parallax information obtained from multiple cameras can be utilized.

Furthermore, a stereoscopic image capturing apparatus using an IP (Integral Photography) system which uses a microlens array is known (JP-A 2006-304230). In this stereoscopic image capturing apparatus, problems such as location deviations or individual differences of camera are not posed, because multi-parallax information is capture by one image sensor.

In the method (JP-A 10-224820), however, there is a feature to be considered that a multi-parallax image having a high picture quality cannot be generated because of a cause such as occlusion. In the method (JP-A 2007-286521), there is a feature to be considered that picture quality degradation is caused by location deviations between cameras, and in addition a problem is caused in processing cost or transmission band because of an increased data quantity. In the method (JP-A 2006-304230), resolution degradation is caused because parallax is assigned by using one image sensor.

SUMMARY OF THE INVENTION

The present invention has been made in view of these circumstances, and an object thereof is to provide a stereoscopic image capturing apparatus and a stereoscopic image capturing system capable of capturing a stereoscopic image from which a multi-parallax image with a reduced data quantity and a high picture quality can be synthesized.

A stereoscopic image capturing apparatus according to an aspect of the present invention includes a first image acquisition unit including a first image formation lens unit which forms a image of an object, and a first image sensor having a plurality of capturing pixels on a surface thereof to receive the image formed by the first image acquisition unit and convert the image to an electric signal, and a second image acquisition unit including a second image formation lens unit which forms a image of the object, a first lens array unit having a plurality of lenses arranged in an array form to receive the image formed by the second image formation lens, and a second image sensor having a plurality of capturing pixels on a surface thereof to receive the formed image through the first lens array unit and convert the image to an electric signal, the second image acquisition unit being disposed at a distance in a horizontal direction from the first image acquisition unit when viewed from the object.

A stereoscopic image capturing system according to an another aspect of the present invention includes a stereoscopic image capturing apparatus according to the first aspect, and a parallax vector generation processing unit which performs parallax vector generation processing on the basis of images of the object acquired by the first image acquisition unit and the second image acquisition unit, the parallax vector generation processing unit including a parallax vector extraction unit which extracts a parallax vector on the basis of the image acquired by the second image acquisition unit, an associated point search unit which searches for an associated point of an image acquired by the first image acquisition unit and a parallax vector extracted by the parallax vector extraction unit, and a parallax vector interpolation unit which interpolates a resolution of the parallax vector by using the associated point searched for by the associated point search unit and the image acquired by the first image acquisition unit.

DESCRIPTION OF THE EMBODIMENTS

A stereoscopic image capturing apparatus or a stereoscopic image capturing system according to an embodiment of the present invention is an apparatus or a system for recording a stereoscopic image required for reproduction when reproducing the stereoscopic image by using a stereoscopic image display apparatus. Prior to description of the stereoscopic image capturing apparatus or the stereoscopic image capturing system according to an embodiment of the present invention, therefore, the stereoscopic image display apparatus will now be described.

Stereoscopic Image Display Apparatus

First, a stereoscopic image display apparatus which displays a stereoscopic image will be described with reference to FIGS. 1 to 4.

(1) Outline of Stereoscopic Image Display Apparatus

Figure 1:
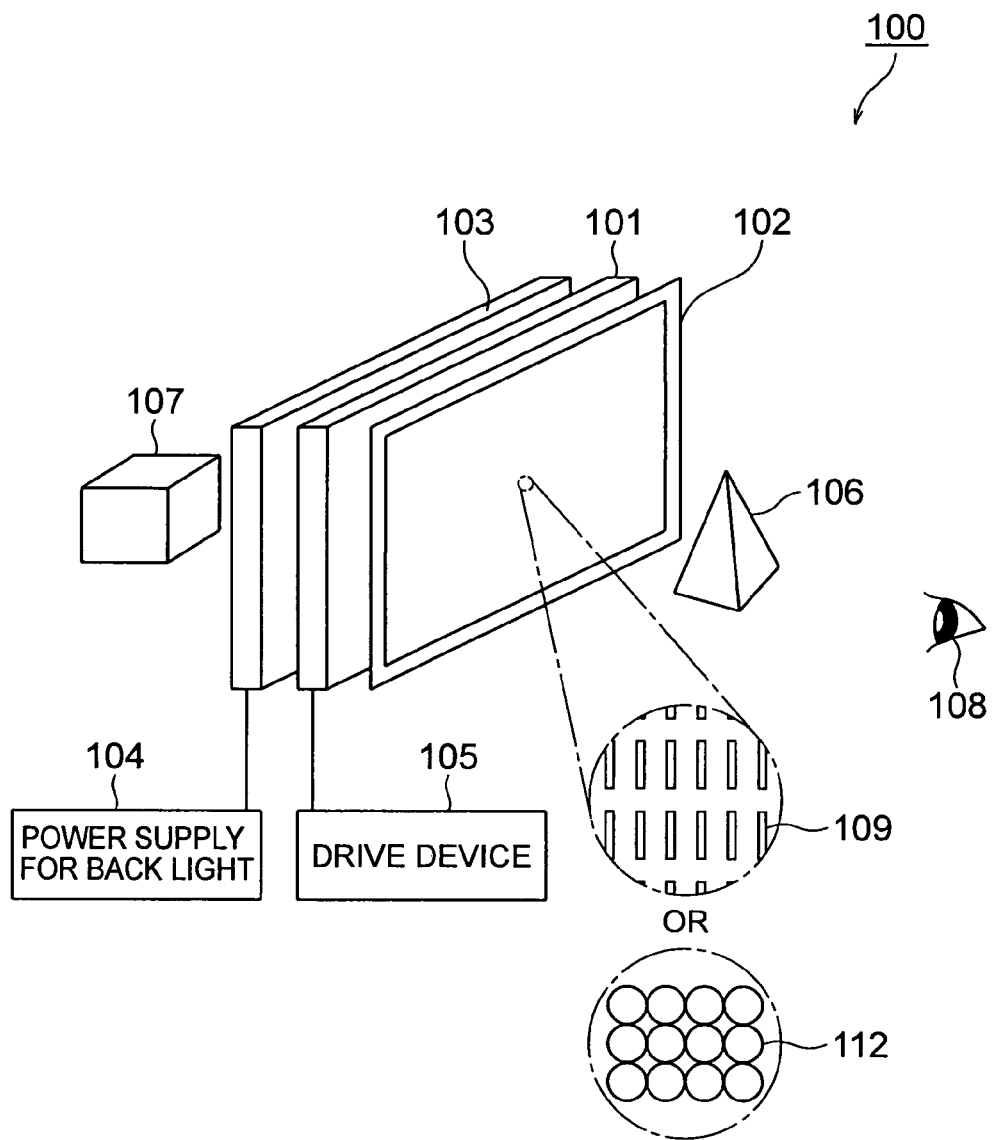
FIG. 1 is an oblique view showing a concrete example of a stereoscopic image display apparatus.

A schematic configuration of a typical stereoscopic image display apparatus is shown in FIG. 1. A stereoscopic image display apparatus 100 includes a LCD 101 serving as a plane display device having a display face formed of pixels each of which includes subpixels of three primary colors R, G and B and which are arranged in a matrix form, an optical plate 102 provided in front of the display face of the LCD 101 to control light rays from pixels of the LCD 101, and a back light 103 provided on the opposite side of the LCD 101 from the optical plate 102 (on the back face side of the LCD 101) and driven by a back light power supply 104.

The LCD 101 is electrically driven by a drive device 105, and parallax information is displayed on each column of the display face. Light emitted from the back light 103 illuminates the display face of the LCD 101.

The optical plate 102 is disposed in a location between the display face of the LCD 101 and a viewer 108. The optical plate 102 can be formed of, for example, a pinhole array plate having pinholes arranged in an array form. A three-dimensional real image 106 is reproduced by a light ray group emitted from pinholes 109 of the pinhole array plate 102, and recognized by the viewer 108. Furthermore, it is also possible to reproduce a three-dimensional virtual image 107 by tracing light rays from the pinhole array plate 102 in the opposite direction from the real image 106. In addition, it is also possible to reproduce three-dimensional images continuously before and behind the pinhole array plate 102. By the way, the known microlens array having microlenses 112 arranged in an array form instead of the pinholes 109 may be used.

(2) Configuration of Stereoscopic Image Display Apparatus

Figure 2:
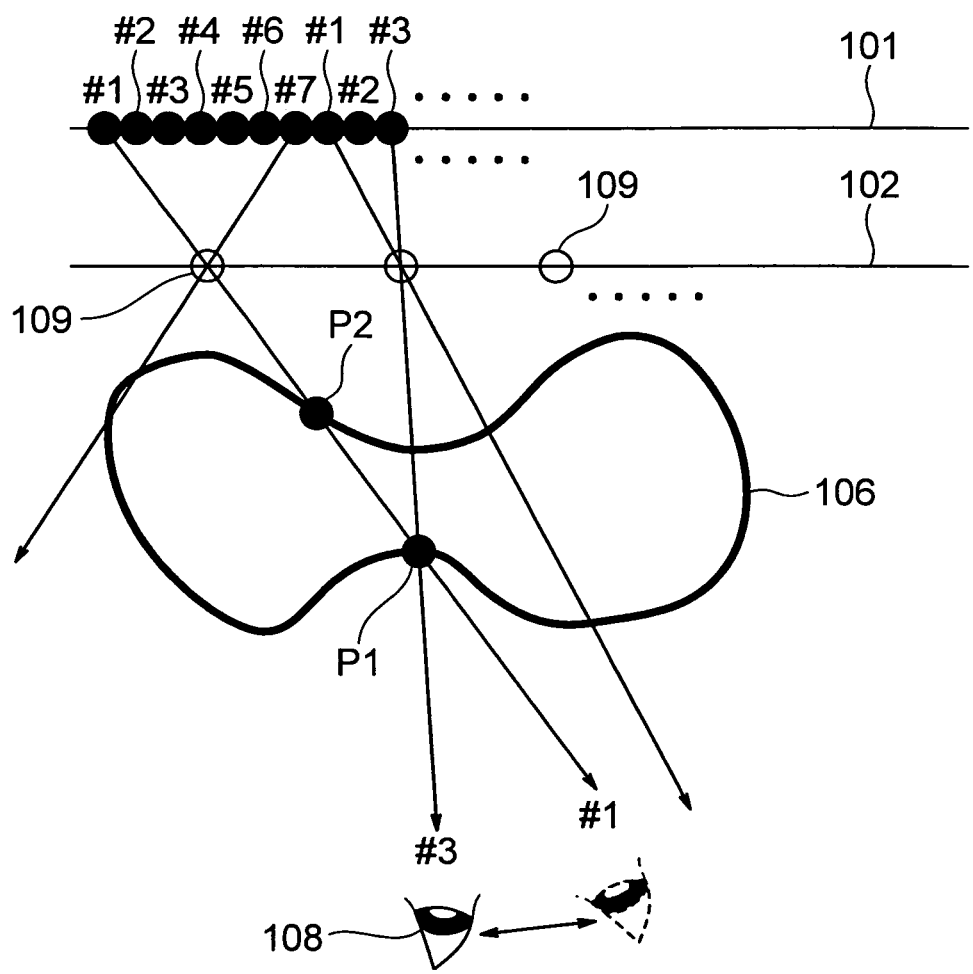
FIG. 2 is a diagram showing relations between a stereoscopic image display apparatus and a stereoscopic image.

The stereoscopic image display apparatus has a configuration described hereafter so as to be capable of reproducing a natural and high definition stereoscopic image without a color split in RGB color mixture. This will now be described with reference to FIG. 2. FIG. 2 is a diagram obtained by viewing location relations between the stereoscopic image display apparatus 100 shown in FIG. 1 and the three-dimensional image 106 from the above. The LCD 101 disposed behind the pinhole array plate 102 when viewed from the viewer 108 displays a parallax image group which differs in how it looks delicately according to the angle, i.e., a multiple visual point image (for example, an image formed of information stored in pixels of #1 to #7). Light emitted from the multiple visual point image is passed through the pinholes 109 to produce a large number of parallax image light ray groups. They are condensed to reproduce the three-dimensional real image 106 (stereoscopic image).

In the LCD 101 which displays a multiple visual point image in a plane way, its minimum drive unit is each of R (red), G (green) and B (blue) subpixels. A color can be reproduced by using three subpixels of R, G and B. Each subpixel displays information of luminance and color obtained at a point where a straight line passing through the subpixel and the center of the pinhole 109 intersects a stereoscopic image on the display space. In general, a straight line drawn from the same subpixel through the same pinhole 109 "intersects the stereoscopic image 106" at a plurality of points. However, a point which is nearest the viewer 108 is regarded as a display point. For example, in FIG. 2, a point P1 located nearer the viewer 108 than a point P2 is regarded as the display point.

(3) Other Configurations of Stereoscopic Image Display Apparatus

Figure 3:
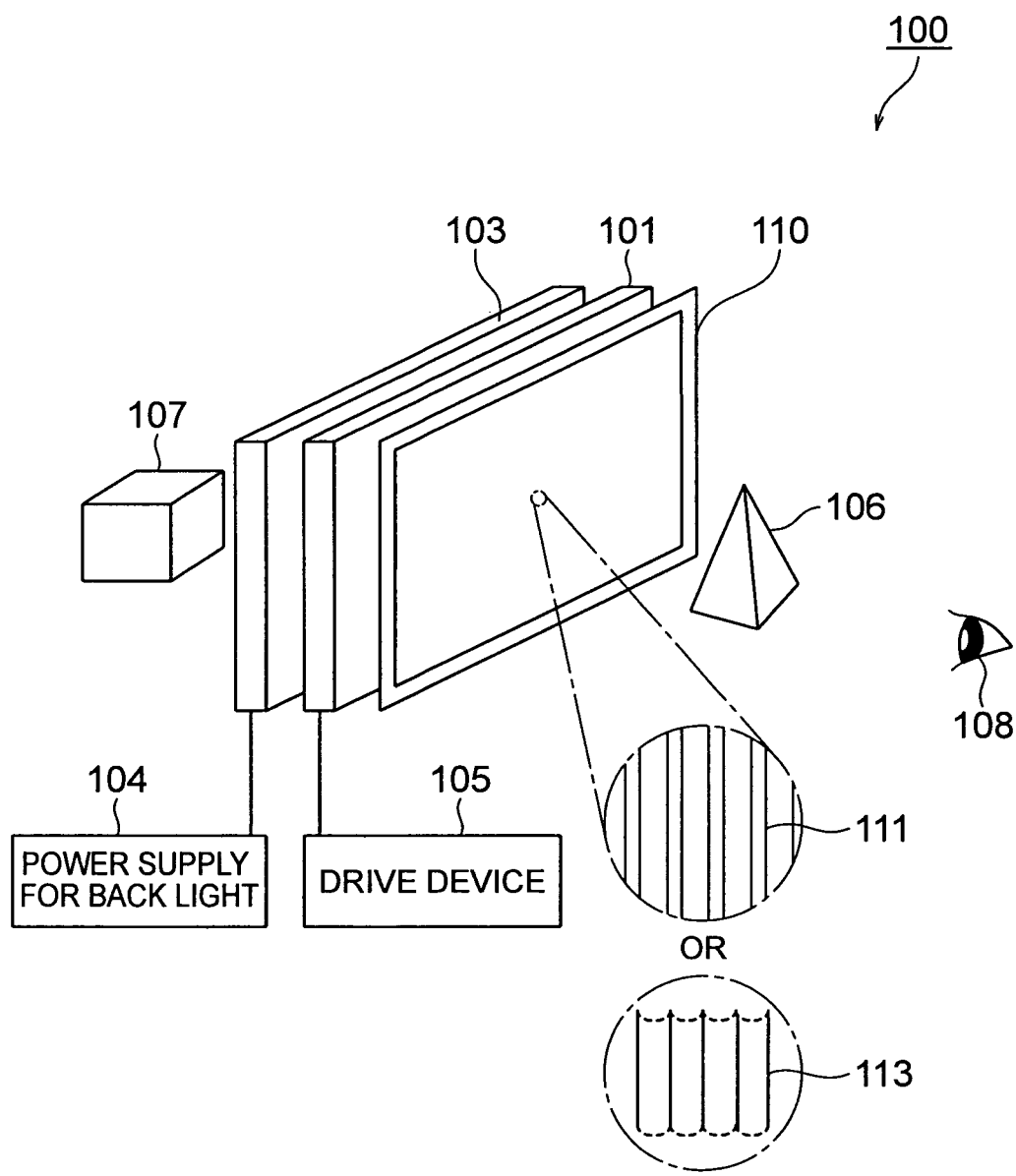
FIG. 3 is an oblique view showing another concrete example of a stereoscopic image display apparatus.
Figure 4:
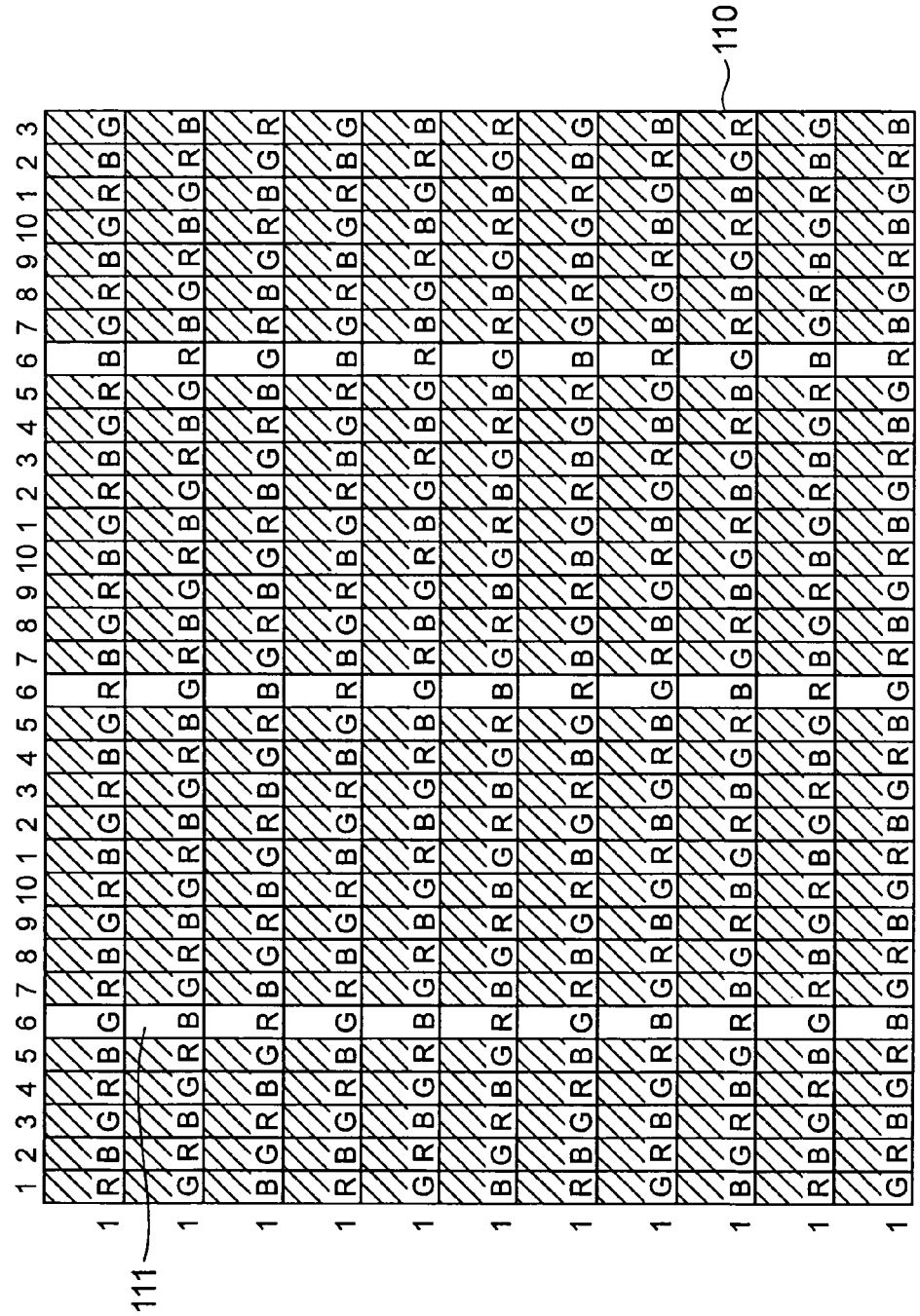
FIG. 4 is a front view of a slit array plate.

By the way, the stereoscopic image display apparatus 100 may have a configuration in which a slit array plate 110 having a plurality of slits 111 arranged in parallel as shown in FIG. 3 is disposed instead of the pinhole array plate serving as the optical plate 102 as shown in FIG. 1. FIG. 4 is a schematic diagram obtained by viewing the slit array plate 110 from the front. As shown in FIG. 4, the slits 111 are provided so as to be nearly parallel to the longitudinal direction (vertical direction) of the arrangement of the subpixels R, G and B. In the configuration in the case where the slit array plate 110 is used, therefore, the parallax in the vertical direction is not considered. The slit array plate 110 is easier in fabrication than the pinhole array plate, and the slit array plate 110 can reproduce a natural and highly definite stereoscopic image having no color separation in the same way as the pinhole array plate 102. By the way, a lenticular sheet 113 may also be used instead of the slit array plate 110.

Stereoscopic Image Capturing Apparatus

Embodiments of the stereoscopic image capturing apparatus according to the present invention will now be described with reference to the drawings.

First Embodiment

Figure 5:
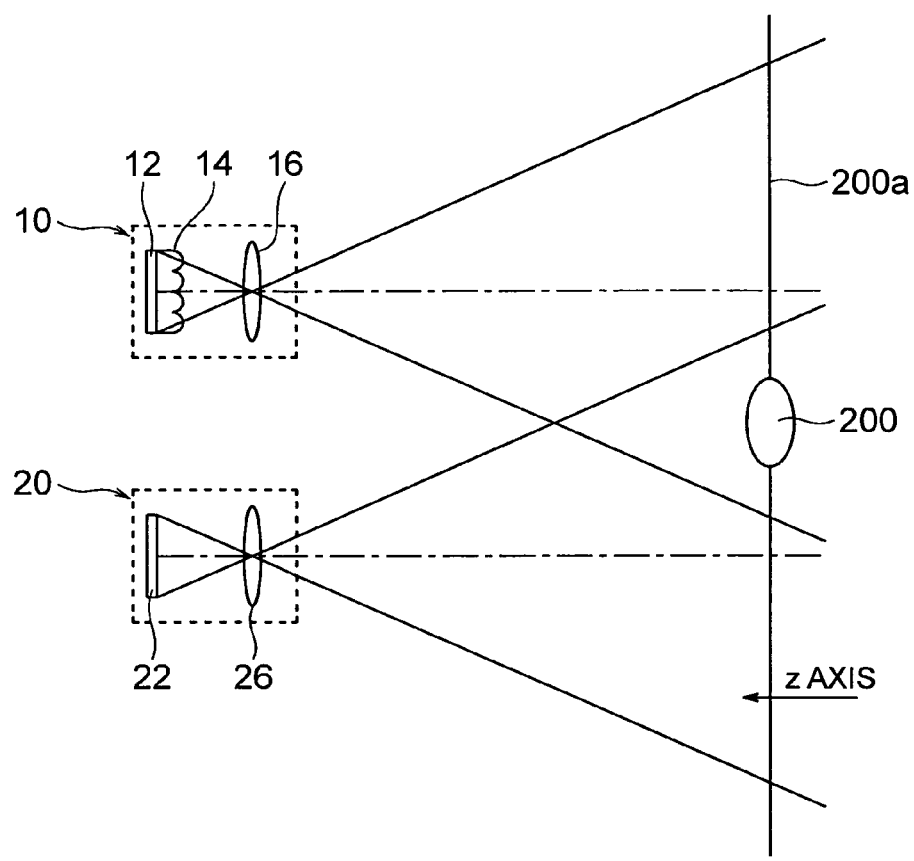
FIG. 5 is a plan view showing a stereoscopic image capturing apparatus according to a first embodiment.

A stereoscopic image capturing apparatus according to a first embodiment of the present invention is shown in FIG. 1. FIG. 5 is a plan view of the stereoscopic image capturing apparatus according to the present embodiment. The stereoscopic image capturing apparatus according to the present embodiment includes a lens array camera 10 and a camera 20. These cameras 10 and 20 are arranged so as to line up in the horizontal direction when viewed from an object 200 and so as to be common in an imaging area. The lens array camera 10 includes an image sensor 12 having photoelectric conversion elements, such as CCDs or CMOSs, (hereafter referred to as capturing pixels or simply pixels as well) capable of capturing a two-dimensional image arranged in a matrix form, a lens array 14 provided in the front of the image sensor 12, and an optical system including an image formation lens 16 to focus light rays from an object to be captured on an image sensor 12 thorough the lens array 14. The camera 20 includes an image sensor 22 having capturing pixels arranged in a matrix form and an optical system including an image formation lens 26 to focus light rays from an object to be captured on an image sensor 22. And each of lenses included in the lens array 14 is formed so as to cover a plurality of capturing pixels. By the way, in the present embodiment, a first straight line which couples a center of the image sensor 12 to a center of the image formation lens 16 is nearly perpendicular to an object plane 200a, and a second straight line which couples a center of the image sensor 22 to a center of the image formation lens 26 is nearly perpendicular to the object plane 200a. The first and second straight lines are disposed on the same plane in the horizontal direction when viewed from the object 200. By the way, the object plane 200a means a perpendicular to the object 200 which includes the object 200.

In the present embodiment, a configuration in which the lens array camera 10 and the camera 20 having no lens array (hereafter referred to as main camera as well) include an overlapping part in an imaging area and a common object is captured becomes a basic form. Although described later with reference to the optical system, the lens array camera 10 can acquire images including a plurality of images from different directions (parallax images) at the same time. Since the lens array camera 10 and the camera 20 are disposed so as to line up in the horizontal direction and have a distance between when viewed from the object 200, there is also a parallax between the lens array camera 10 and the camera 20. In the ensuing description, a cylindrical lens array having a cylindrical shape is taken as an example. However, a microlens array can also be used.

Figure 6:
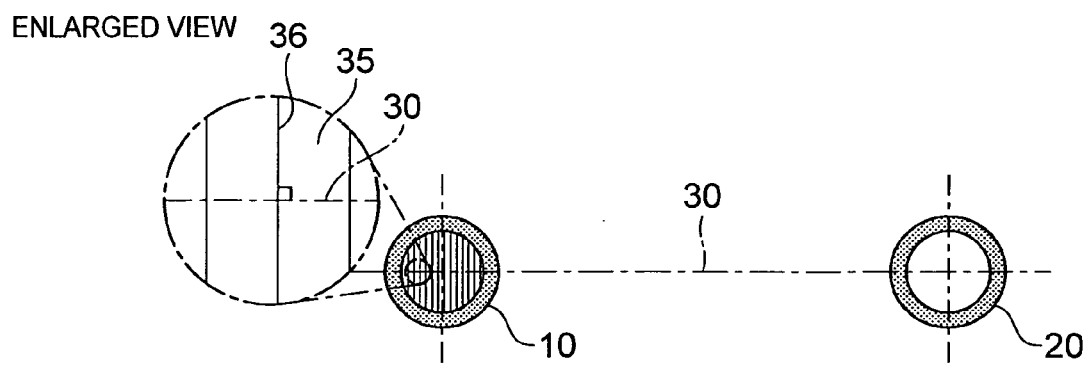
FIG. 6 is a front view of the stereoscopic image capturing apparatus according to the first embodiment.

An example in which a cylindrical lens is used as the lens array 14 is shown in FIG. 6. FIG. 6 is a front view obtained when the lens array camera 10 and the camera 20 are viewed from a direction of an arrow z (direction of the object 200) in FIG. 5. The camera 10 using a cylindrical lens array can capture an image having a parallax in a direction which is nearly perpendicular to a ridgeline of a lens (a direction having lens power). The camera 20 is installed in the direction having a parallax. Such installation brings about an arrangement in which the parallax captured by the lens array camera 10 and the parallax of the camera 20 have the same vector. In other words, a base line 30 of the lens array camera 10 and the camera 20, i.e., a line 30 which couples a center of the lens array camera 10 to a center of the camera 20 is in a direction which is nearly perpendicular to a ridgeline 36 of a cylindrical lens 35.

An image which can be captured by the lens array camera 10 has a parallax. However, the resolution of capturing lowers to one severalth of the resolution parallax of the image sensor. The stereoscopic image capturing apparatus according to the present embodiment includes at least the lens array camera 10 and the camera 20 having no lens array. The stereoscopic image capturing apparatus according to the present embodiment captures a plurality of parallax images by using images of a low resolution with the lens array camera 10 and a high resolution image by using the camera 20. The stereoscopic image capturing apparatus according to the present embodiment is configured so as to cause vectors of the parallax between the cameras 10 and 20 and the parallax of the lens array camera 10 to coincide with each other. Therefore, the image captured by the stereoscopic image capturing apparatus according to the present embodiment includes a plurality of images having fine parallax intervals and one image having the same vector as the images and a large parallax interval. As for the resolution, the image captured by the stereoscopic image capturing apparatus according to the present embodiment includes images having a fine resolution and the image having a coarse resolution. In other words, the images captured by the stereoscopic image capturing apparatus according to the present embodiment are information in which the parallax and resolution can be easily interpolated. Therefore, the stereoscopic image capturing apparatus according to the present embodiment can capture images which are capable of interpolating multi-parallax images which are small in data quantity and high in resolution.

Optical System

The optical system in the present embodiment will now be described.

Figure 7:
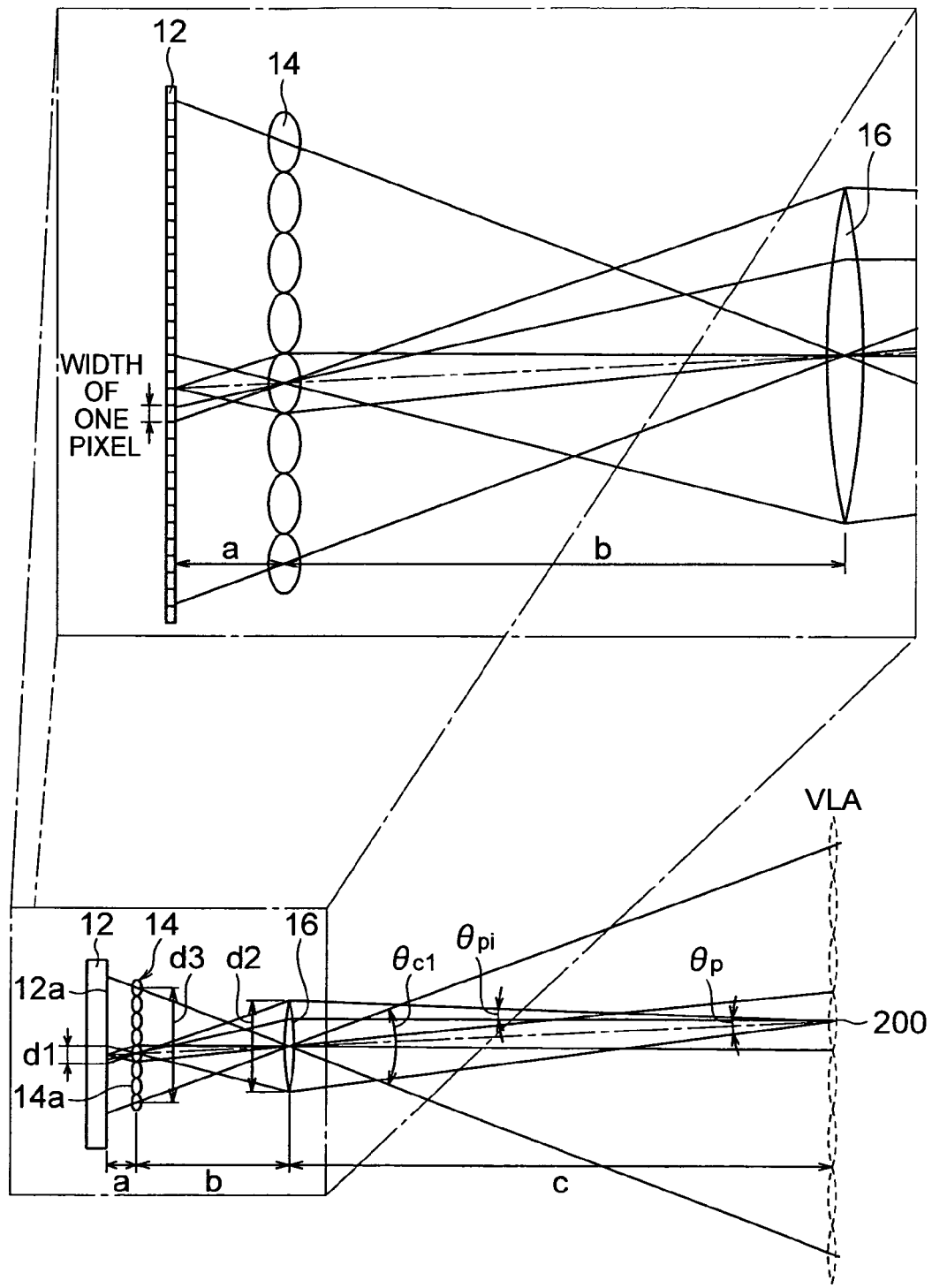
FIG. 7 is a plan view showing an optical system in a lens array camera.

FIG. 7 shows the optical system in the lens array camera 10 according to the present embodiment. Denoting a distance between an image sensor plane 12a and a plane 14a of the lens array 14 by "a", a distance between the lens array 14 and the image formation lens 16 by "b", a distance between the image formation lens 16 and a supposed location of the object 200 by "c", a focal length of the lens array 14 by $f_{LA}$, and a focal length of the image formation lens 16 by $f_{L1}$, image formation relations can be represented by the following expressions.

$$1/a - 1/(-b) = 1/f_{LA} \quad (1)$$

$$1/b - 1/(-c) = 1/f_{L1} \quad (2)$$

The following expression can be obtained from the expressions (1) and (2).

$$1/a + 1/f_{L1} - 1/c = 1/f_{LA} \quad (3)$$

Considering by using reverse trace of light rays in such a state, the lens array 14 is in an image formation relation to a virtual image lens array VLA which is considered to be in a location of the object 200. An image captured at this time becomes an integral image observed through the virtual image lens array VLA by using the plane of the image formation lens 16 as the common imaging plane. The integral image is an image captured through the lens array or the like. A minute image called elemental image is captured by each of the lenses. By viewing through the captured lens array, an image having a synthesized parallax is reproduced by the whole array. The resolution of the parallax image depends upon the lens array. The angle area of the parallax corresponds to the angle of view of the lens, and the number of parallaxes corresponds to the number of pixels of the elemental image. Furthermore, it is also possible to separate a multiple visual point image by reconstructing the integral image. Therefore, the resolution of the multiple visual point image reconstructed from the integral image which is captured by the present optical system corresponds to the lens pitch of the virtual image lens array VLA. And the parallax angle range $\theta_P$ which can be captured becomes an angle obtained by viewing an aperture d2 of the image formation lens 16 from the lens center of the virtual image lens array VLA. The parallax angle range $\theta_P$ can be represented by Expression (4). Furthermore, the number of parallaxes N depends upon the number of image sensors assigned to each lens array. The angle pitch $\theta_{Pi}$ becomes of one parallax can be represented by Expression (5).

$$\theta_P \sim 2 \times \tan^{-1}(d2/(2 \times c)) \quad (4)$$

$$\theta_{Pi} \sim \theta_P/N \quad (5)$$

Here, "~" means that both sides thereof are nearly equal. It is meant that the left side can be approximated by the expression on the right side. Expression (4) and Expression (5) are approximation expressions at the center of the lens 16, and they differ slightly depending upon the location. Since the integral image has the image formation lens as the common imaging plane, $\theta_P$ has a feature that it shifts toward the screen end unlike the ordinary integral image. This shift quantity corresponds to an angle shift of an image having a perspective. Here, the perspective corresponds to an angle shift of an image according to perspective representation. The image according to the perspective representation can be compared to an image of a pinhole camera, and it is an image formed from light rays having different angles with the pinhole center used as the reference axis. At this time, the center of the pinhole corresponds to the image formation lens 16. In other words, it is represented that the lens array camera 10 can capture an integral image having a perspective. The angle of view $\theta_{c1}$ of this image can be represented by Expression (6).

$$\theta_{c1} = 2 \times \tan^{-1}(d3/(2 \times b)) \quad (6)$$

Here, d3 is a lens array width.

Design Example

A width d1 of the elemental image in the integral image is designed according to Expression (7) on the basis of a pixel pitch $P_P$ and the number of parallaxes N. A lens pitch of the lens array 14 is designed on the basis of the pixel pitch $P_P$ and the number of parallaxes N. Details thereof will be described with reference to a third embodiment. A region where actual light enters depends upon the aperture width d2 of the image formation lens 16. The distance "a" from the lens array 14 for ensuring the width d1 of the elemental image should be determined according to Expression (8). If the distance "a" deviates from the value represented by Expression (8), then crosstalk between elemental images or a dark line is caused. As a matter of fact, the distance "a" can be regulated by adjusting the width d1 instead of the distance "a".

$$d1 = P_P \times N \quad (7)$$

$$a = b \times d1/d2 \quad (8)$$

If the distance "a" is thus determined, then the focal length $f_{LA}$ of the lens array 14 can be determined according to Expression (3) by using the focal length $f_{L1}$ of the image formation lens 16 in the lens array camera 10 and the distance "b".

Figure 8:
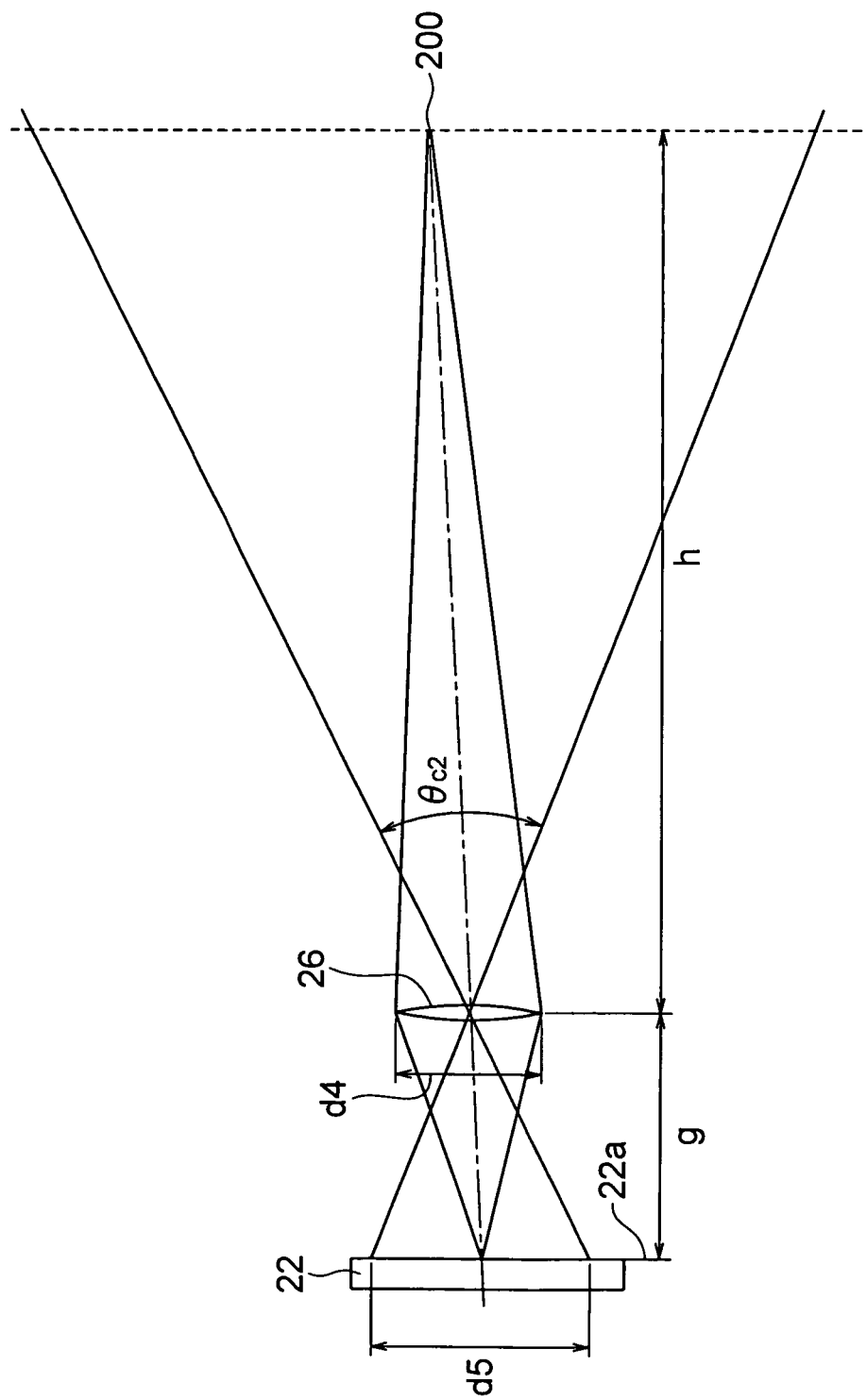
FIG. 8 is a plan view showing an optical system in a main camera.

An optical system in the camera 20 is shown in FIG. 8. In FIG. 8, d4 denotes an aperture of the image formation lens 16, d5 denotes an image sensor effective area, g denotes a distance between an imaging plane 22a of the image sensor 22 and the image formation lens 26, and h denotes a distance between the image formation lens 26 and the object 200. Relations among the angle of view $\theta_{c2}$, the distance g, the distance h, d4 and d5 are the same as those in the ordinary camera, and a similar design should be performed. As for the focal length $f_{L2}$ of the image formation lens 26 and the distance g as well, design is performed in the same way as the ordinary camera. This will be described in detail later.

Second Embodiment

Figure 9:
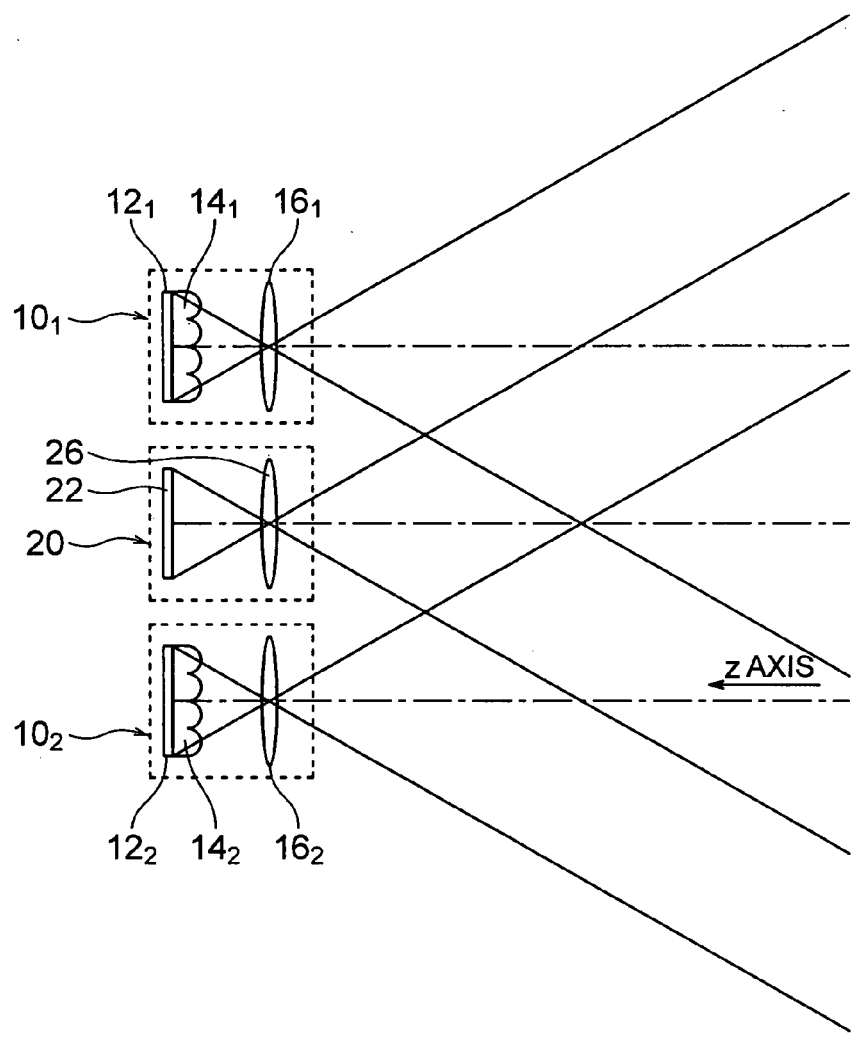
FIG. 9 is a plan view showing a stereoscopic image capturing apparatus according to a second embodiment.
Figure 10:
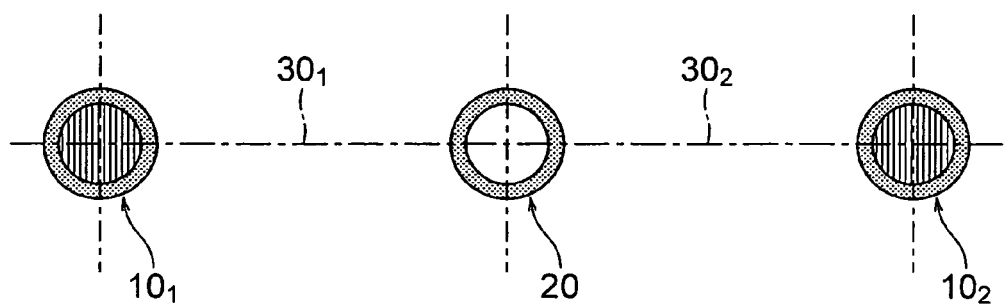
FIG. 10 is a front view of the stereoscopic image capturing apparatus according to the second embodiment.

A stereoscopic image capturing apparatus according to a second embodiment of the present invention will now be described with reference to FIGS. 9 and 10. FIG. 9 is a plan view of the stereoscopic image capturing apparatus according to the present embodiment. FIG. 10 is a front view of the stereoscopic image capturing apparatus obtained when viewed from a direction of an arrow z (direction of the object) shown in FIG. 9. The stereoscopic image capturing apparatus according to the present embodiment includes two lens array cameras $10_1$ and $10_2$ and a camera 20. In other words, the present embodiment has a configuration obtained by providing one additional lens array camera in the first embodiment. The lens array cameras $10_1$ and $10_2$ are disposed on the left and right sides of the camera 20 in the horizontal direction when viewed from the object. In other words, a base line $30_1$ between the lens array camera $10_1$ and the camera 20 and a base line $30_2$ between the lens array camera $10_2$ and the camera 20 are arranged so as to be disposed nearly on the same straight line. At this time, therefore, arrangement is performed so as to cause ridgelines of cylindrical lenses included in each of the lens arrays $14_1$ and $14_2$ respectively in the lens array cameras $10_1$ and $10_2$ to be nearly perpendicular to the base lines between the cameras. It is also possible to use at least two lens array cameras in this way. In this case, an overlap portion of imaging areas becomes a utilization area. Therefore, it is also possible to capture the same area of the object while utilizing the whole of the image sensor face of the image sensors $12_1$ and $12_2$ and the image sensor 22, i.e., use pixels effectively by performing convergence arrangement of cameras or shift arrangement of the cameras.

The images captured by the stereoscopic image capturing apparatus according to the present embodiment are information in which the parallax and resolution can be easily interpolated in the same way as the first embodiment. Therefore, the stereoscopic image capturing apparatus according to the present embodiment can capture images which are capable of interpolating multi-parallax images which are small in data quantity and high in resolution.

Third Embodiment

Figure 11:
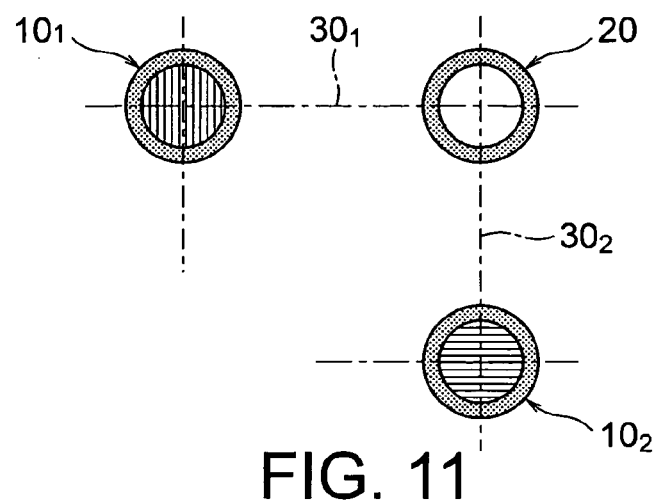
FIG. 11 is a front view of a stereoscopic image capturing apparatus according to a third embodiment.

A stereoscopic image capturing apparatus according to a third embodiment of the present invention will now be described with reference to FIG. 11. FIG. 11 is a front view of the stereoscopic image capturing apparatus according to the present embodiment obtained when viewed from the object. The stereoscopic image capturing apparatus according to this embodiment has a configuration obtained from that of the stereoscopic image capturing apparatus according to the second embodiment by arranging the lens array cameras $10_1$ and $10_2$ and the camera 20 so as to cause a base line $30_1$ between the lens array camera $10_1$ and the camera 20 to be nearly perpendicular to a base line $30_2$ between the lens array camera $10_2$ and the camera 20. In other words, when viewed from the object, the lens array camera $10_1$ is disposed in the horizontal direction of the camera 20 and the lens array camera $10_2$ is disposed in the vertical direction of the camera 20. Ridgelines of cylindrical lenses in the lens array camera $10_1$ disposed in the horizontal direction extend in the vertical direction when viewed from the object, and are nearly perpendicular to the base line $30_1$ between the lens array camera $10_1$ and the camera 20. In the same way, ridgelines of cylindrical lenses in the lens array camera $10_2$ disposed in the vertical direction extend in the horizontal direction when viewed from the object, and are nearly perpendicular to the base line $30_2$ between the lens array camera $10_2$ and the camera 20. In this way, the lens array cameras $10_1$ and $10_2$ can be disposed at different angles such as in the horizontal direction or the vertical direction with the camera 20 disposed in common. In the present embodiment, a base line $30_1$ between the lens array camera $10_1$ and the camera 20 and a base line $30_2$ between the lens array camera $10_2$ and the camera 20 are arranged so as to be nearly perpendicular to each other. This is because the parallax vector is in a direction perpendicular to the lens array, and it becomes easy to interpolate the parallax and resolution by aligning parallax vectors between cameras. If such an arrangement is performed, then the parallax vector is obtained as its horizontal component and its vertical component, and consequently a three-dimensional parallax vector can be found. In the same way as the second embodiment, pixels can be used effectively by performing convergence arrangement of cameras or shift arrangement of the cameras.

The images captured by the stereoscopic image capturing apparatus according to the present embodiment are information in which the parallax and resolution can be easily interpolated in the same way as the first embodiment. Therefore, the stereoscopic image capturing apparatus according to the present embodiment can capture images which are capable of interpolating multi-parallax images which are small in data quantity and high in resolution.

Fourth Embodiment

Figure 12:
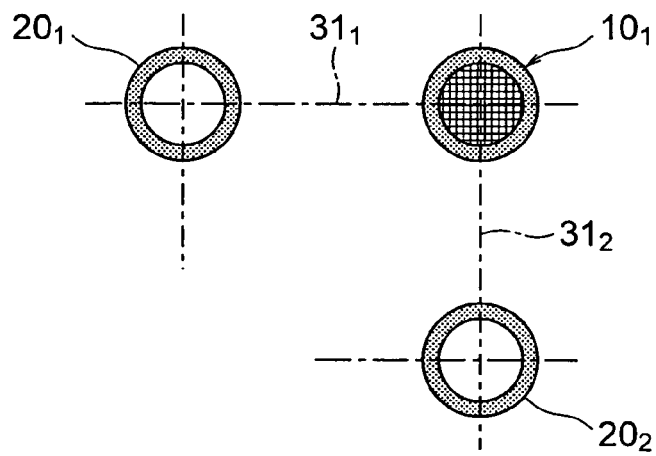
FIG. 12 is a front view of a stereoscopic image capturing apparatus according to a fourth embodiment.

A stereoscopic image capturing apparatus according to a fourth embodiment of the present invention will now be described with reference to FIG. 12. FIG. 12 is a front view of the stereoscopic image capturing apparatus according to the present embodiment obtained when viewed from the object. The stereoscopic image capturing apparatus according to the present embodiment has a configuration obtained by arranging one lens array camera $10_1$ having a microlens array as its lens array, and two cameras $20_1$ and $20_2$ which do not have a lens array so as to cause a base line $30_1$ between the lens array camera $10_1$ and the camera $20_1$ to be nearly perpendicular to a base line $31_2$ between the lens array camera $10_1$ and the camera $20_2$. In other words, the camera $20_1$ is disposed in a horizontal direction to the lens array camera $10_1$ and the camera $20_2$ is disposed in a vertical direction to the lens array camera $10_1$ viewed from the object. The lens array camera $10_1$ having a microlens array can acquire a three-dimensional parallax including horizontal and vertical parallaxes. The resolution of the elemental image using the microlens is degraded to one severalth of the parallax in both the horizontal and vertical directions. In order to interpolate this resolution, two cameras $20_1$ and $20_2$ are disposed so as to bring about a coordinate system in which parallax vectors of image data are perpendicular to each other, and the corresponding image data are interpolated. In this way, a plurality of cameras $20_1$ and $20_2$ having no lens arrays can be disposed. In the same way as the second embodiment, pixels can also be used effectively by performing convergence arrangement of cameras or shift arrangement of the cameras.

Fifth Embodiment

Figure 13:
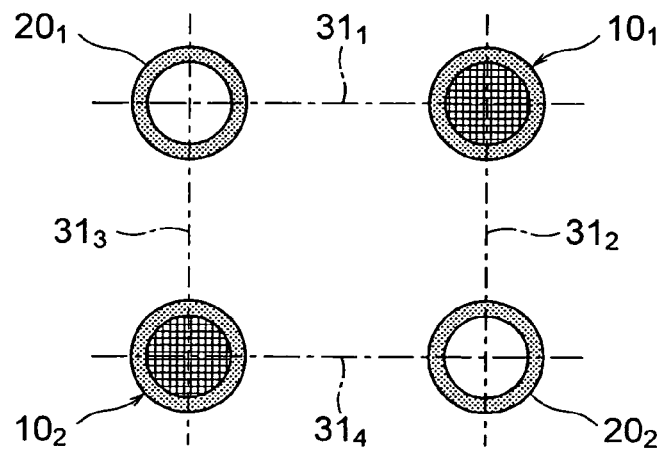
FIG. 13 is a front view of a stereoscopic image capturing apparatus according to a fifth embodiment.

A stereoscopic image capturing apparatus according to a fifth embodiment of the present invention will now be described with reference to FIG. 13. FIG. 13 is a front view of the stereoscopic image capturing apparatus according to the present embodiment obtained when viewed from the object. The stereoscopic image capturing apparatus according to the present embodiment has a configuration obtained from the stereoscopic image capturing apparatus according to the fourth embodiment shown in FIG. 12 by providing one additional lens array camera $10_2$ having a microlens array as a lens array and causing a base line $31_3$ between the lens array camera $10_2$ and the camera $20_1$ and a base line $31_4$ between the lens array camera $10_2$ and the camera $20_2$ are arranged so as to be perpendicular to each other.

It is possible to further interpolate parallax vectors in the horizontal direction and the vertical direction each other by using two lens array cameras each having a microlens array as in the present embodiment. In this way, an arrangement having a plurality of lens array cameras and a plurality of cameras which do not have a lens array is considerable. It is also possible to use pixels effectively by performing convergence arrangement of cameras or shift arrangement of the cameras in the same way as the second embodiment.

The images captured by the stereoscopic image capturing apparatus according to the present embodiment are information in which the parallax and resolution can be easily interpolated in the same way as the first embodiment. Therefore, the stereoscopic image capturing apparatus according to the present embodiment can capture images which are capable of interpolating multi-parallax images which are small in data quantity and high in resolution.

Hereafter, components of the stereoscopic image capturing apparatuses described in the first to fifth embodiments will be described in detail.

Cylindrical Lens

As the lens array, both the microlens array and the cylindrical lens array are considerable. Here, the case where the cylindrical lens array is used will be described in more detail.

The cylindrical lens array includes cylindrical lenses each taking the shape of a cylindrical lens arranged in an array form. The cylindrical lens array has its lens power only in a direction perpendicular to ridgelines of the cylindrical lenses. Therefore, a lens array camera using a cylindrical lens array can capture an image having a parallax only in a direction having the lens power. When in the cylindrical lens array a lens 35 is disposed so as to have a ridgeline 36 in the vertical direction viewed from the object, the camera 20 is disposed in a location deviated from the lens array camera 10 in the horizontal direction. The lens array camera 10 has a parallax in the horizontal direction, and it coincides with the parallax between the cameras. The horizontal resolution lowers to one severalth of the parallax assigned to the horizontal direction. As compared with a microlens array in which the resolution degradation occurs in the horizontal and vertical directions, the resolution degrades only in the horizontal direction. Therefore, the efficiency is high in extracting the parallax vector.

Lens Pitch of Lens Array

Figure 14:
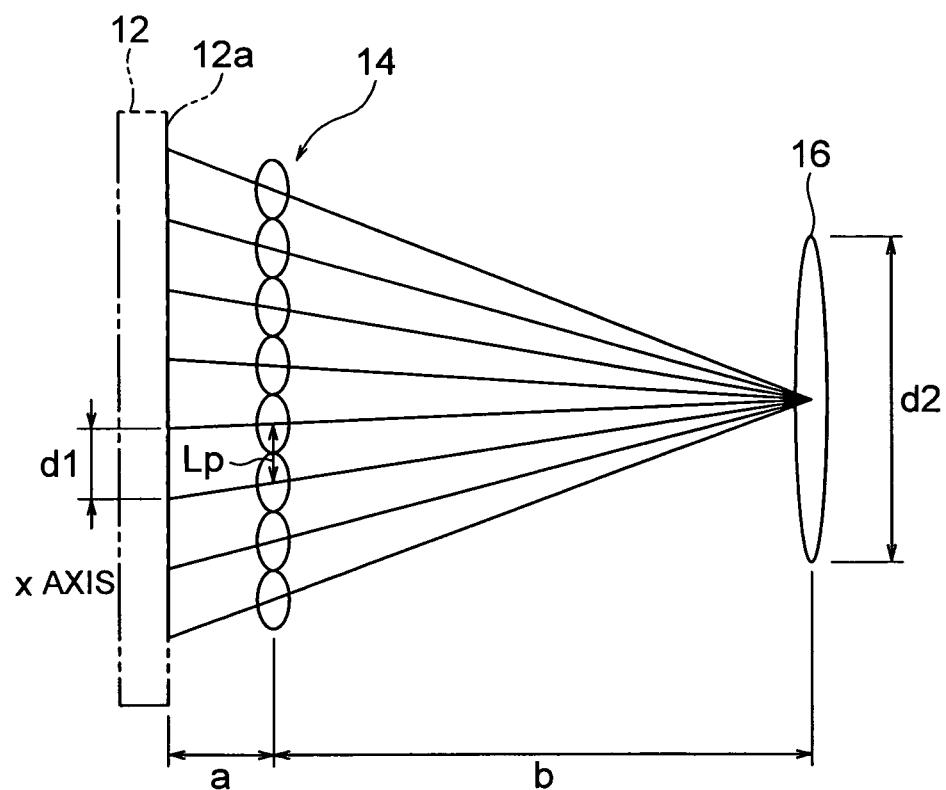
FIG. 14 is a diagram showing relations between a lens pitch of a lens array and an image sensor.

Relations between the lens pitch of the lens array 14 and pixels of the image sensor 12 will now be described with reference to FIG. 14. FIG. 14 is a diagram for explaining the relations between the lens pitch of the lens array 14 and the pixels of the image sensor 12. The center of an elemental image is on a line extended from a line which couples the center of the image formation lens 16 and a center of each of lenses included in the lens array 14. The elemental image width d1 (called elemental image pitch as well) corresponds to intervals between straight lines passing through centers of the elemental images on the image sensor plane 12a. Denoting the distance between the lens array 14 and the image sensor 12 by "a", and the distance between the lens array 14 and the image formation lens 16 by "b", a lens pitch Lp is represented by the following expression.

$$Lp = d1 \times b/(a+b) \quad (9)$$

When the elemental image pitch d1 is made equal to an integer times the pixel pitch Pp as represented by Expression (7), the lens pitch Lp can also be designed from Expression (9) as well. At this time, the lens pitch Lp becomes a width which is slightly narrower than the elemental image pitch d1 according to Expression (9). In the case where such a design is performed, a shift occurs in the parallax angle similar to the image having a perspective in the image location. In other words, a parallax quantity corresponding to the image captured through the lens array 14 changes (shifts) according to the image location. Denoting a location on the image sensor plane 12a by x, a shift quantity $\theta_{ps}$ of the capturing angle area can be represented by the following expression.

$$\tan \theta_{ps} = x/(a+b) \quad (10)$$

In this shift quantity $\theta_{ps}$, an angle which is not a discrete value caused by a pixel is added every elemental image, and consequently a deviation which is not a discrete value occurs in angle data. In other words, angle data of each lens in the lens array 14 becomes angle data which differs in angle according to the image location unlike equal interval angle data obtained by one image sensor 12.

On the other hand, when the elemental image pitch d1 is sufficiently smaller than the aperture width d2 of the image formation lens 16, the lens pitch Lp becomes very close to the elemental image pitch d1. As represented by Expression (11), therefore, Lp is set equal to a value of an integer times the pixel pitch.

$$Lp = Pp \times N \quad (11)$$

Since the elemental image pitch d1 satisfies Expression (9), it assumes a value which is slightly larger than the value represented by Expression (7). The elemental image width d1 does not become a discrete value of the pixel value. By quantizing the elemental image width do, the shift quantity $\theta_{ps}$ is also quantized on the same scale. Therefore, the shift quantity of the capturing angle can be handled as a discrete value taking a pixel as the unit. This means that the angle of the plane of the virtual image lens array VLA is quantized discretely. It is facilitated to handle a coordinate system handling the angle. In other words, according to the perspective representation, parallax data obtained from the lens array camera 10 which obtains different angle data according to the pixel location can be handled with angle data quantized at equal angle intervals which is obtained from the pixel interval in the image sensor. Even if Lp obtained by substituting Expression (11) or Expression (7) into Expression (9) cannot be reproduced strictly, it is possible to perform adjustment by quantization with a pixel taken as the unit.

Image Formation Lens

The image formation lenses 26 and 16 respectively of the camera 20 and the lens array camera 10 will now be described. As shown in FIG. 8, the optical system in the camera 20 becomes an optical system which forms an image from light at different angles with the lens center taken as the axis and records the image. The image can be said to be an image having a perspective. A retinal image viewed by the naked eyes is similar, and a natural image felt by human being can be captured. Association of the image of the camera 20 with pixels of the lens array camera 10 inclusive of the angle dimension is simplified by making the perspectives equal to each other. For aligning the perspectives with each other, the focal length of the camera 20 should be made equal to that of the lens array camera 10 and the distance "b" shown in FIG. 7 should be made equal to a distance "g" shown in FIG. 8. In other words, in an arrangement in which a lens array is disposed on the image sensor plane 22a of the camera 20, angles of view $\theta_{c1}$ and $\theta_{c2}$ between the cameras can be made equal to each other.

Convergence Arrangement of Cameras

Figure 15:
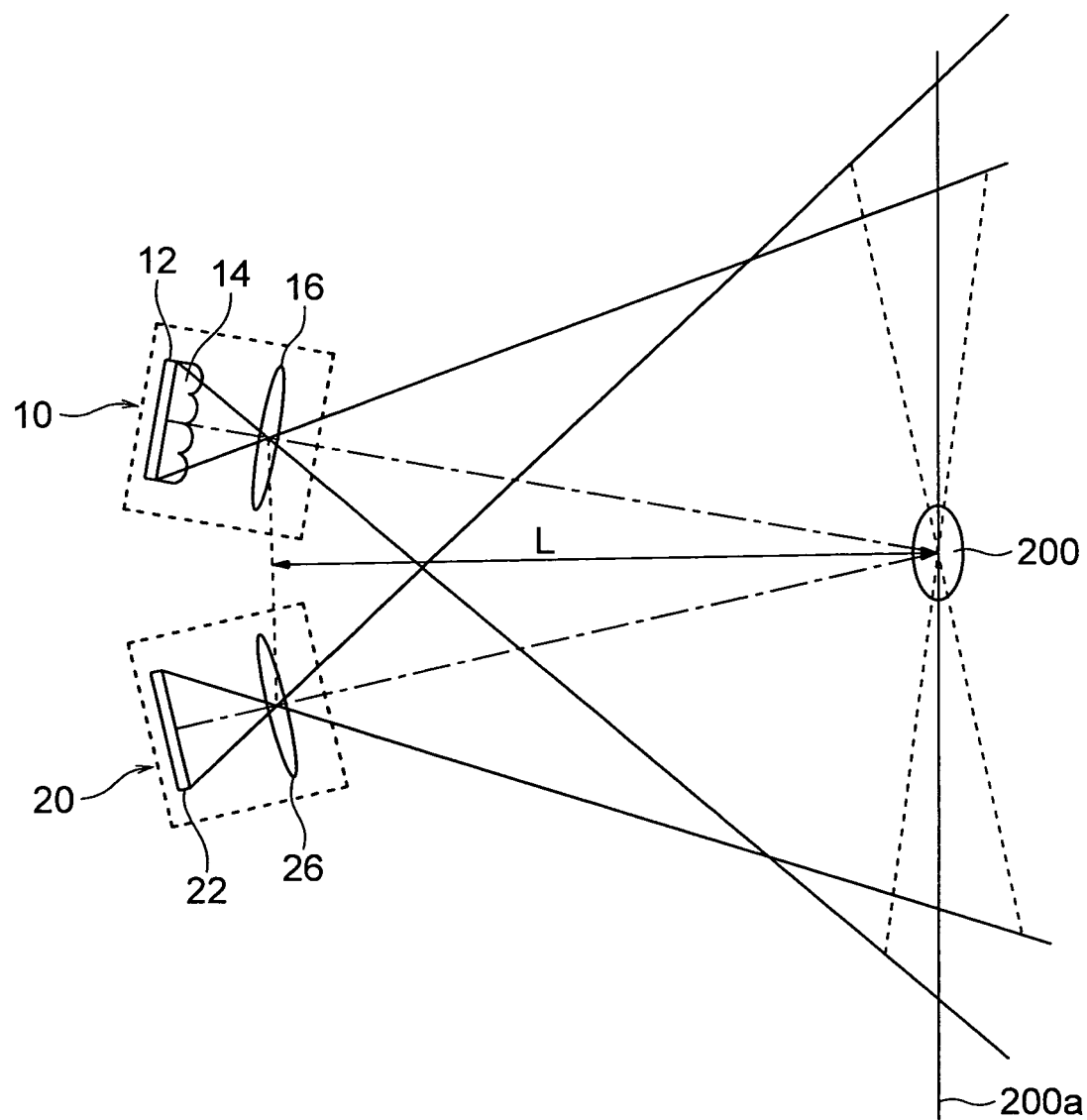
FIG. 15 is a diagram showing a convergence arrangement of cameras.

An arrangement of the cameras for effectively using pixels will now be described with reference to FIG. 15. FIG. 15 is a plan view showing an example of the convergence arrangement of the cameras. As described in the first embodiment, a part corresponding as an image becomes an overlap part of imaging areas. If the camera 20 and the lens array camera 10 face to the same direction as shown in FIG. 5 described in the first embodiment, then a part which does not overlap occurs in the imaging area and pixels in that part do not become effective.

A convergence arrangement of cameras which prevents a non-overlapping part from occurring in imaging areas by rotating both cameras in the lens array camera 10 and the camera 20 which do not have a lens array so as to expand an area in which pixels become effective at a supposed capturing distance L (a distance between a line coupling centers of the two cameras and the object 200) as shown in, for example, FIG. 15 is conceivable. Although not illustrated, similar effects can be obtained by rotating a camera in one of the lens array camera 10 and the camera 20.

Design of Shift of Image Sensor

A camera arrangement for effectively using pixels will now be described. In the convergence arrangement of cameras shown in FIG. 15, the effective area of pixels can be expanded. However, the object plane 200a inclines to the image sensor plane. Because of the effect of the perspective in addition, distortion like a key stone occurs in a rectangle shape on the object plane 200a. Since this distortion can also be corrected by a projection change, it is also possible to correct the distortion by image processing.

Figure 16:
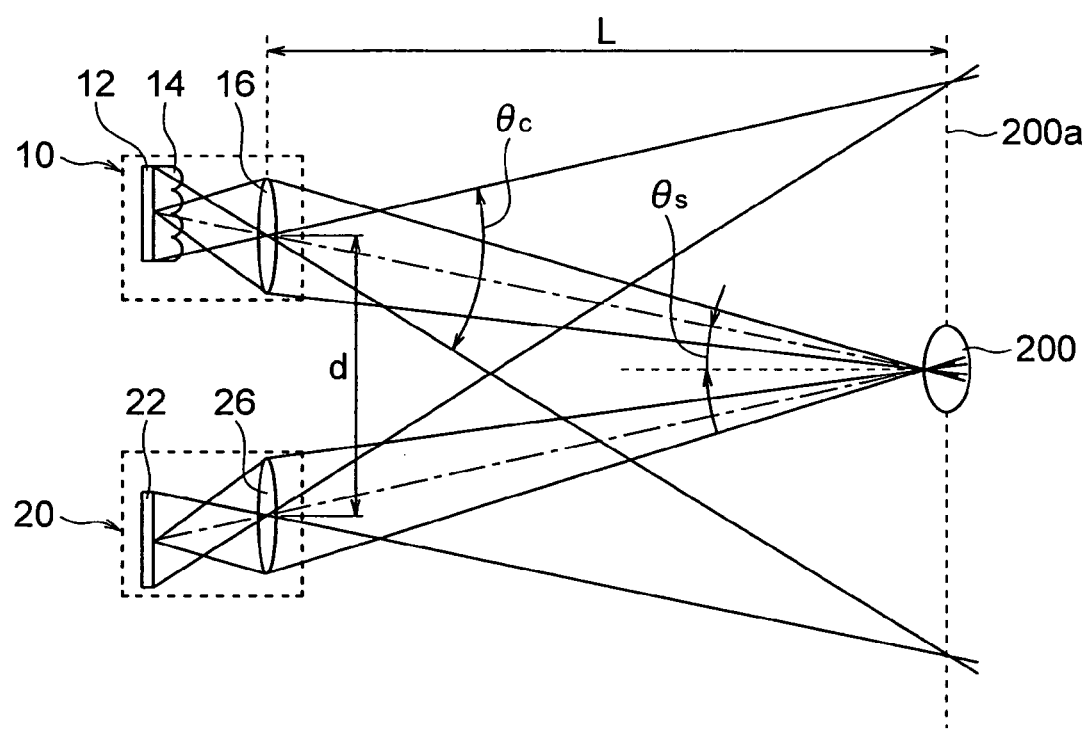
FIG. 16 is a diagram for explaining a shift arrangement of image sensors.

If the convergence arrangement is disadvantageous in processing time and cost, then distortion can be prevented from being generated by disposing the image sensors 12 and 22 in locations shifted from the image formation lenses 16 and 26 as shown in FIG. 16. In this shift arrangement, the distance between the center of the image sensor 12 and the center of the second image sensor 22 is greater than the distance between the center of the image formation lens 16 and the center of the image formation lens 26. Furthermore, this shift arrangement is made possible by inclining a line coupling the center of the image sensor 12 and the center of the image formation lens 16 so as to shift an angle formed by the line and the object plane 200a from 90 degrees by a shift quantity $\theta_s$ and inclining a line coupling the center of the image sensor 22 and the center of the image formation lens 26 so as to shift an angle formed by the line and the object plane 200a from 90 degrees by the shift quantity $\theta_s$. In an image captured by the image sensors 12 and 22 thus subjected to the shift arrangement, the key stone type distortion does not occur unlike the convergence arrangement, because the object plane 200a does not differ between cameras. Denoting a distance between centers of the image formation lenses 16 and 26 by d and a distance between the object plane 200a and the image formation lenses 16 and 26 by L, the shift quantity $\theta_s$ can be represented by the following expression.

$$\theta_s = \tan^{-1}(d/2L) \tag{13}$$

Expression (13) corresponds to the case where the cameras 10 and 20 are shifted by the same angle and the object 200 located in the center between the cameras is supposed. It is also possible to design shift quantities which differ from camera to camera in the camera arrangement. If the shift quantity is large, then there is a possibility that image distortion due to the image formation characteristics or the lens will be caused by extra-axis aberration or the like. Therefore, it is conceivable to design the image formation lenses supposing the shifted image planes.

It is also possible to display captured images to each other as in the TV conference by combining a display such as the stereoscopic image display apparatus with the above-described stereoscopic image capturing apparatus. In that case, it is also possible to dispose cameras on a side face of the display. In this case, it is also possible to design the shift angle and the convergence angle by regarding the center of the display as the center of the supposed captured image.

[C] Stereoscopic Image Capturing System

Embodiments of the stereoscopic image capturing system according to the present invention will now be described with reference to the drawings. The stereoscopic image capturing systems according to the ensuing embodiments are based on the assumption that the above-described stereoscopic image capturing apparatus is used.

Sixth Embodiment

Figure 17:
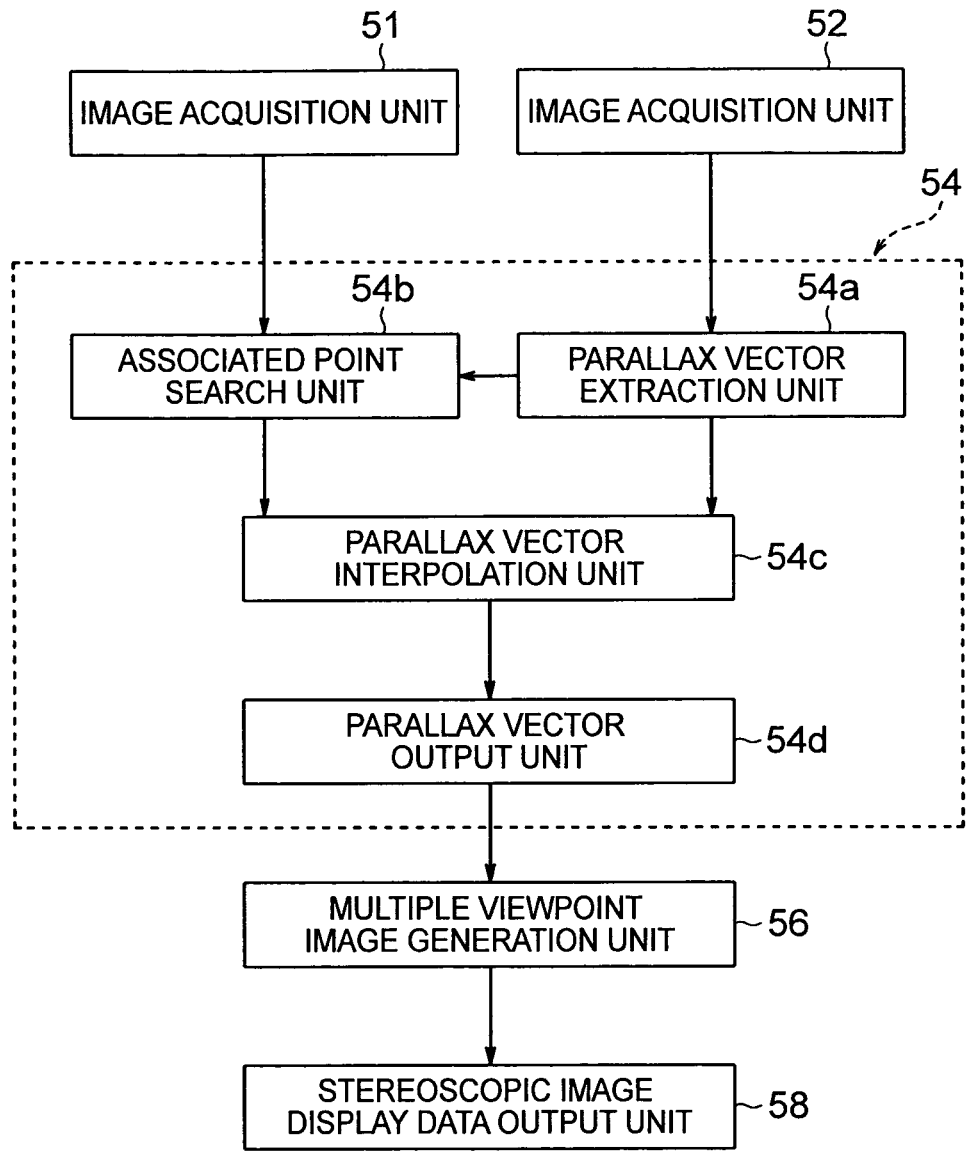
FIG. 17 is a block diagram showing a stereoscopic image capturing system according to a sixth embodiment.

A stereoscopic image capturing system according to a sixth embodiment of the present invention will now be described with reference to FIG. 17. FIG. 17 is a block diagram showing a schematic configuration of the stereoscopic image capturing system according to the present embodiment. The stereoscopic image capturing system according to the present embodiment includes at least two image acquisition units 51 and 52, a parallax vector generation processing unit 54, a multiple visual point image generation unit 56, and a stereoscopic image display data output unit 58. The image acquisition unit 51 corresponds to a camera which does not have a lens array (for example, the camera 20 shown in FIG. 5), and the image acquisition unit 52 corresponds to a lens array camera (for example, the camera 10 shown in FIG. 5). The lens array camera 10 is low in resolution, but it can capture the parallax.

Image data obtained by the image acquisition units 51 and 52 are subject to processing in the parallax vector generation processing unit 54. The parallax vector generation processing unit 54 includes a parallax vector extraction unit 54a, an associated point search unit 54b, a parallax vector interpolation unit 54c, and a parallax vector output unit 54d. The parallax vector extraction unit 54a extracts a parallax vector on the basis of image data acquired by the image acquisition unit 52 which is low in resolution but which has a parallax. The associated point search unit 54b searches for and obtains a point associated with high resolution image data which is associated with the extracted parallax vector and acquired by the image acquisition unit 51. The parallax vector interpolation unit 54c interpolates resolution of the associated low resolution parallax vector by using high resolution image data at the obtained associated point. The parallax vector output unit 54d outputs the parallax vector interpolated by the parallax vector interpolation unit 54c. Data thus generated can be output as a parallax vector having a high resolution and a high precision.

The multiple visual point image generation unit 56 generates a visual point image at an arbitrary angle, i.e., a multiple visual point image by using the parallax vector output from the parallax vector output unit 54d. Stereoscopic image display data required for stereoscopic image display is generated by using the generated multiple visual point image and output from the stereoscopic image display data output unit 58. Visual information containing depth information of the captured space can be presented by performing pixel conversion conformed to the stereoscopic image display apparatus and displaying the result.

As heretofore described, the stereoscopic image capturing system according to the present embodiment becomes an image system capable of interpolating high resolution multi-parallax images from images captured with a reduced quantity of data. It is also possible to perform high quality stereoscopic display by using the multi-parallax data.

Components of the stereoscopic image capturing system according to the present embodiment will now be described in more detail.

Relations Between Hardware Pixels and Parallax

The parallax quantity of a camera having no lens array (hereafter referred to as main camera as well) depends upon the relative location of the main camera with respect to a lens array camera paired with the main camera. An angle formed by an optical axis of the lens array camera and an optical axis of the main camera is a main angle difference between the cameras, and this becomes a relative parallax angle. For example, in the case of the arrangement shown in FIG. 16, the relative main parallax angle may be considered to be twice the shift angle $\theta_s$ represented by Expression (13). If an axis perpendicular to the image sensors 12 and 22 is defined as a reference axis, the main parallax angle becomes an angle formed by the reference axis and the optical axis. In the case of the arrangement shown in FIG. 16, the main parallax angle can be given by the shift angle $\theta_s$ represented by Expression (13) (the sign is given by the coordinate system).

In the case where a typical lens is used, an image of perspective projection with the principal point of the lens taken as the center can be captured. In such a case, the angle of acquired light differs from pixel to pixel. The parallax angle of the captured pixel becomes an angle which couples a pixel location and the principal point of the lens. Calculation can be performed in the same way in the case where the lens is shifted as shown in FIG. 16 as well, and the parallax angle of the captured pixel becomes an angle obtained by offsetting the shift $\theta_s$. If the cameras are subjected to the convergence arrangement as shown in FIG. 15, then a normal line of the object plane is defined as a reference axis and the angle is calculated. In other words, it is necessary to add a rotation angle of a camera from a base line of the cameras (a line which couples lens principal points of cameras) as an offset.

As an approximation, it is conceivable to give the main parallax angle as the parallax angle of the camera. If the image sensors of the cameras and lens principal points are disposed in parallel to the same axis as shown in FIG. 5, then a central location of an area used for capturing (a pixel area which can be used in common) and lens principal points can also be given as a main parallax angle.

Parallax Angle of Lens Array Camera

The parallax angle of the lens array camera can be considered to be the sum of an angle depending upon the arrangement, an angle on a perspective projection image, and a parallax angle depending upon the lens array. The angle depending upon the arrangement and the angle on a perspective projection image are similar to those described with reference to the main camera, and the principal point of the lens array should be considered as the reference location of the perspective projection.

Figure 18:
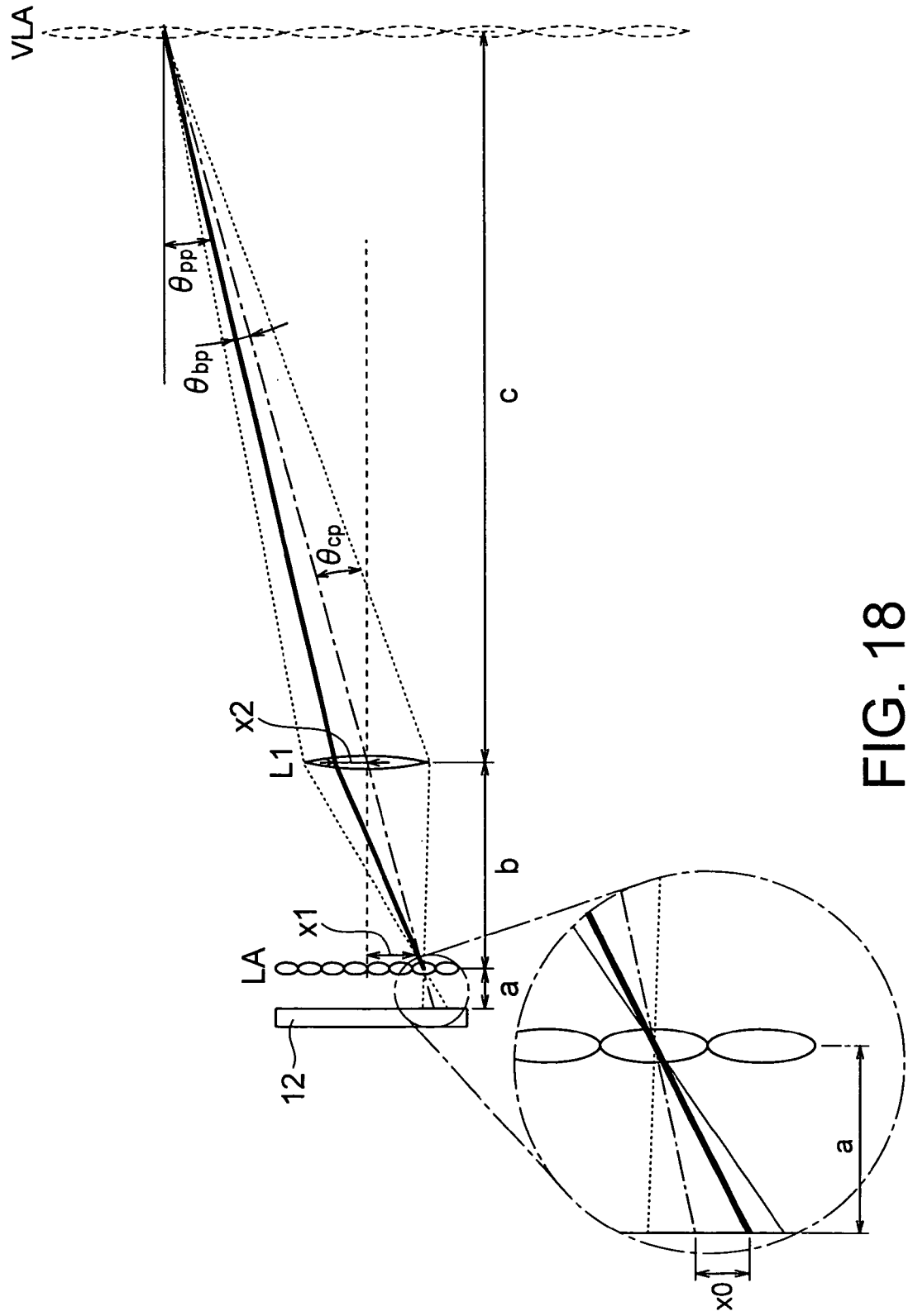
FIG. 18 is a diagram for explaining relations between light rays and parallax angles.

FIG. 18 shows relations between the light ray and the parallax angles. Behavior of the light ray will now be described by tracing the light conversely and the parallax angle depending upon the lens array will now be described. A straight line coupling the principal point of the lens array LA to an image sensor subjected to light reception is refracted to a center of an associated virtual image of the lens array on the virtual image plane (hereafter referred to as VLA plane as well) by a lens L1. A parallax angle of this pixel becomes θpp. The angle θcp on the perspective projection is given by the following expression.

$$\theta cp = \tan^{-1}(x1/b)$$

Here, b is a distance between the lens array LA and the lens L1, and x1 is a distance from a lens center of the lens array LA. An associated point x2 on the lens L1 obtained by tracing light conversely from x0 of an element location is obtained by the following expression.

$$x2 = x1/a \times b$$

The parallax angle θbp depending upon the lens array LA is obtained approximately by the following expression.

$$\theta bp \approx \theta p/d2 \times x2$$

θpp becomes $$\theta pp \sim \theta cp + \theta bp$$

(The sign of each angle is given by the coordinate system depending upon the location.) θpp is a parallax angle of a light ray which can be acquired by a pixel of the image sensor. As a matter of fact, an angle designed beforehand can be given to each pixel according to a pixel address associated with the lens array LA, and consequently it is not necessary to give an angle by an approximate calculation. In other words, a parallax angle can be associated with each pixel by giving the parallax angle θcp of perspective projection to each associated pixel of the lens array LA in the case of the lens array camera and giving an associated parallax angle θbp (inclusive of a negative sign) to each pixel in addition to the offset angle depending upon the arrangement.

Data Structure Conversion

The concept of the light ray space and the light ray space conversion of the data structure will now be described.

Figure 19:
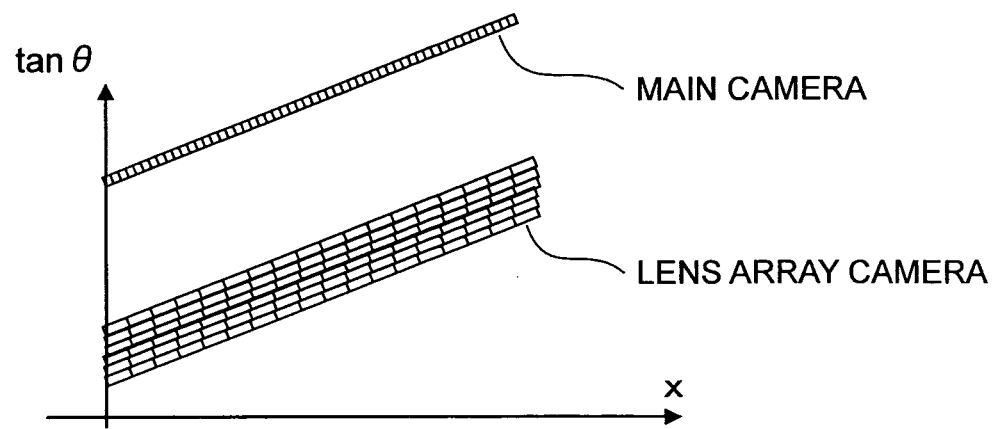
FIG. 19 is a diagram showing relations between a light ray space and acquired images.

The light ray space is a space which represents a plurality of visual points on an epi-polar line by using locations and light ray angles (tan θ). If the base line of the cameras is regarded as the horizontal direction and the ridgeline of the cylindrical lens is regarded as the vertical direction, then pixels having the same horizontal address should be disposed on an axis which indicates tan θ so as to be associated with angles in the parallax direction. When the reference plane which becomes a location in the light ray space is used as a supposed object plane (VLS plane), association relations between the light ray space and acquired images as shown in FIG. 19 can be obtained. As for data of the lens array camera, the angle of the VLA plane differs according to the relations between the lens array and pixels as already described with reference to the stereoscopic image capturing apparatus. Locations according to parameters of the optical system are rearranged on the axis which indicates tan θ in accordance with the pixel location. Specifically, rearrangement from the angle interval given by Expression (5) and the shift angle given by Expression (10) is performed.

Figure 20:
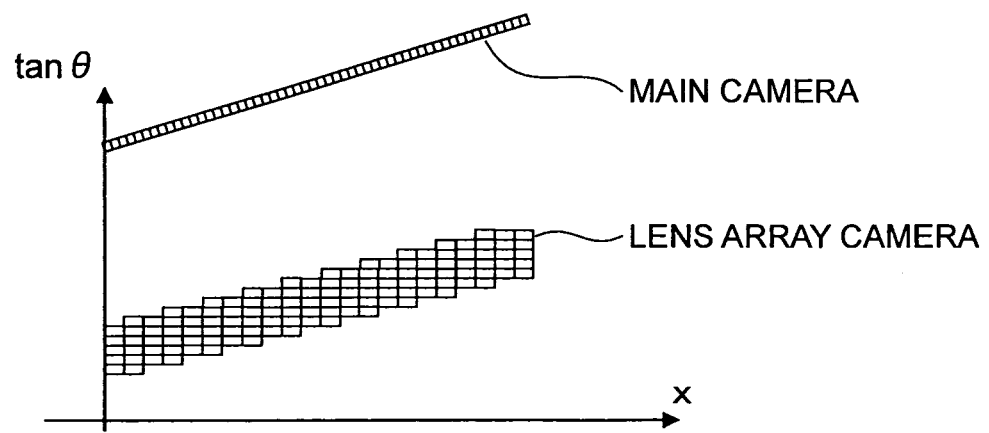
FIG. 20 is a diagram showing a light ray space obtained when the lens pitch of the lens array is an integer times as large as the pixel pitch of the image sensor.

If the lens pitch is given under the condition represented by Expression (11), relations shown in FIG. 20 are obtained. Upon being associated with this light ray space, pixels having the same depth location and having no anisotropy form a straight line having the same inclination. Extraction and interpolation can be performed simply by managing the straight line as a parallax vector.

Relations Between Camera Space and Light Ray Space

Figure 21:
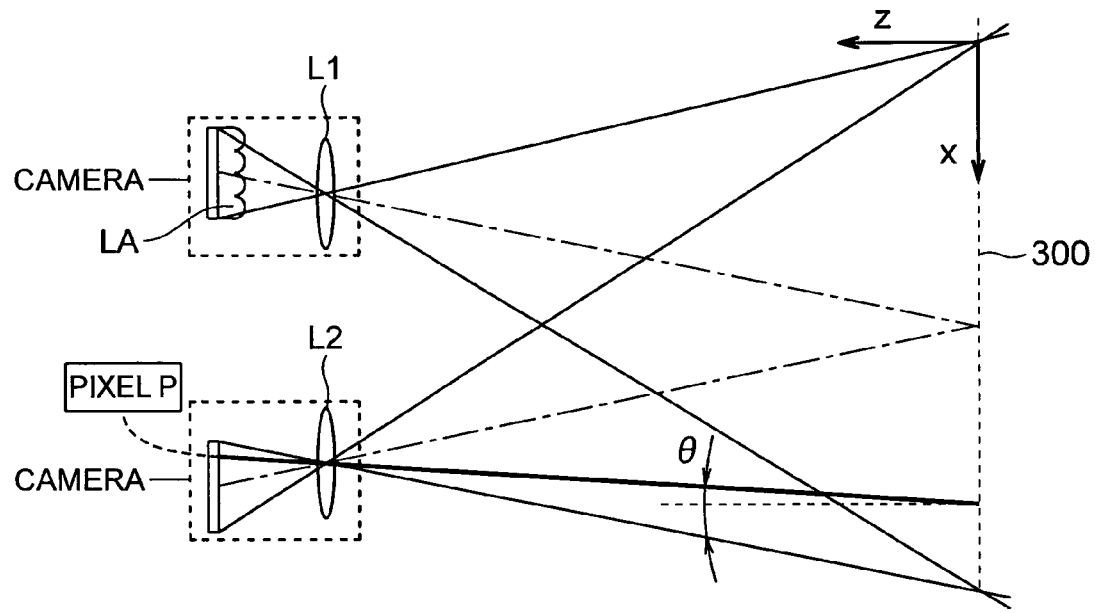
FIG. 21 is a diagram for explaining relations between a coordinate system and cameras.

Relations between the camera space and the light ray space will now be described. Relations between the camera space and the light ray space are shown in FIG. 21. A coordinate system having an imaging plane (supposed image formation location) 300 as a reference plane and having one end of the imaging plane 300 (an end of a common region captured by cameras) as an origin is set. An angle θ obtained by using a normal line (the z-axis) of the imaging plane 300 as a reference axis is defined as parallax angle. For example, a pixel P in the main camera shown in FIG. 21 has a parallax angle θ and gives an x coordinate of an intersection with the reference plane. An image obtained by arranging pixel values (values having luminance information and chromaticity information such as R, G and B) in a light ray space having the x coordinate in the space and the axis indicating the value of tan θ as two axes which are perpendicular to each other (which may be three axes inclusive of the y axis) is referred to as light ray space image. This light ray space image indicates the angle of a base line direction of the cameras, and corresponds to a pixel on the epi-polar line. It indicates an associated point retrieval area to be used in stereo matching or the like.

Simple Light Ray Space Association

Even if angle data is not accurate, parallax vector extraction and interpolation can be performed. When the perspective of the lens array camera is set equal to that of the main camera, the shift quantity becomes equal. Therefore, it is also possible to use a simple data conversion method in which data are arranged in the parallax direction and location in accordance with only arrangement of pixels.

Figure 22:
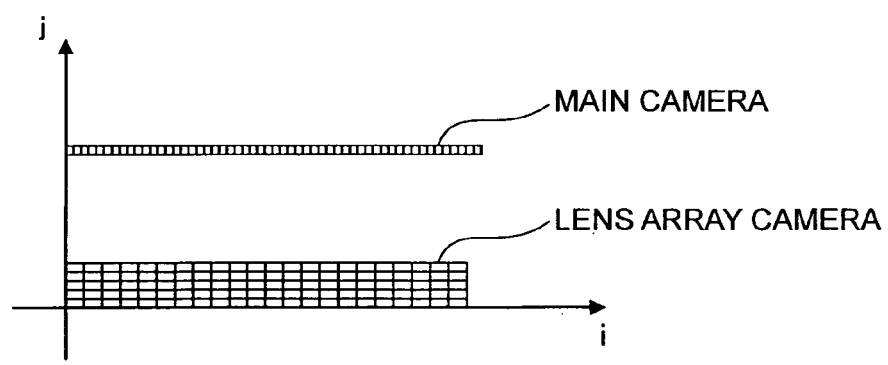
FIG. 22 is a diagram showing a simple light ray space.

FIG. 22 shows a simple light ray space. As for coordinate axes, an axis associated with the location is defined as "i" and an axis associated with the angle is defined as "j", and they are indicated. A real space coordinate is associated with a pixel address of the main camera. In the same way, the "i" axis can be given as the pixel address of the main camera. In the lens array camera, the lens array number is associated with the location. It should be now noted that the lens array camera differs from the main camera in pixel pitch, and "i" is associated with the pitch ratio. On the angle axis "j", an angle associated with one pixel interval of the lens array camera is given as a minimum unit, and the main parallax angle between the main camera and the lens array camera is disposed by finding its ratio to the angle interval of one pixel in the lens array camera. In other words, in this simple light ray space, the perspective of the lens array camera is set equal to that of the main camera. By handling disregarding the angel deviation, therefore, the lens array camera handles the parallax angle depending upon the lens array and the main camera handles it as a parallax depending upon the distance from the lens array camera. Since data thus arranged are associated with the light ray space, contradictions do not occur in the associated point search processing and the interpolation processing described later. Furthermore, it is congenial and efficient when computation is performed in a computer or the like.

(Modification)

Figure 23:
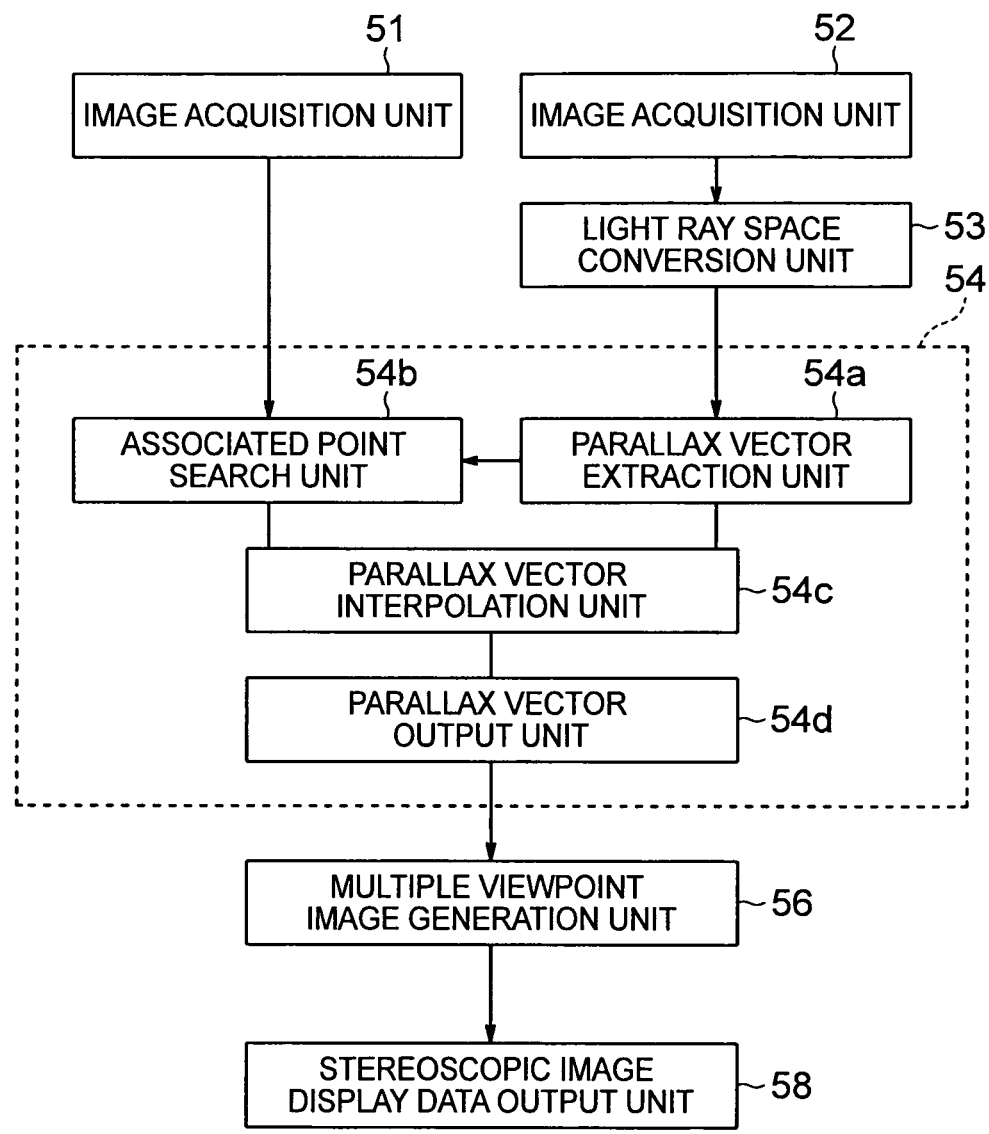
FIG. 23 is a block diagram showing a stereoscopic image capturing system according to a modification of the sixth embodiment.

A stereoscopic image capturing system according to a modification of the present embodiment is shown in FIG. 23. The stereoscopic image capturing system according to the modification has a configuration obtained from that of the stereoscopic image capturing system according to the sixth embodiment shown in FIG. 17 by providing a light ray space conversion unit 53 between the image acquisition unit 52 and the parallax vector extraction unit 54a. In this modification, parallax vector extraction can be performed easily by converting an image acquired by the image acquisition unit 52 which is the lens array camera to a light ray space by using the light ray space conversion unit 53.

Parallax Vector Extraction

Figure 24:
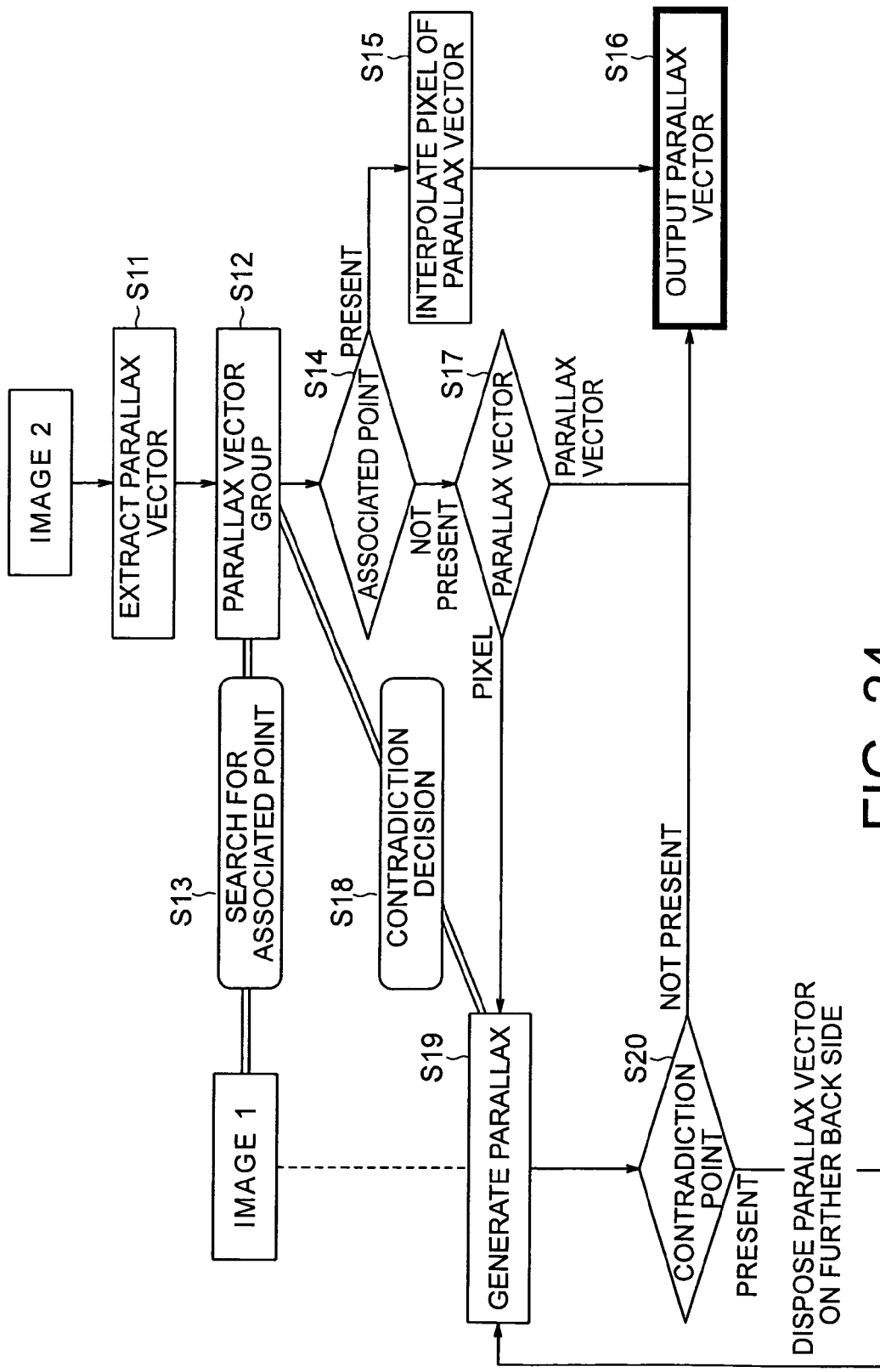
FIG. 24 is a flow chart showing a parallax vector extraction procedure.
Figure 25:
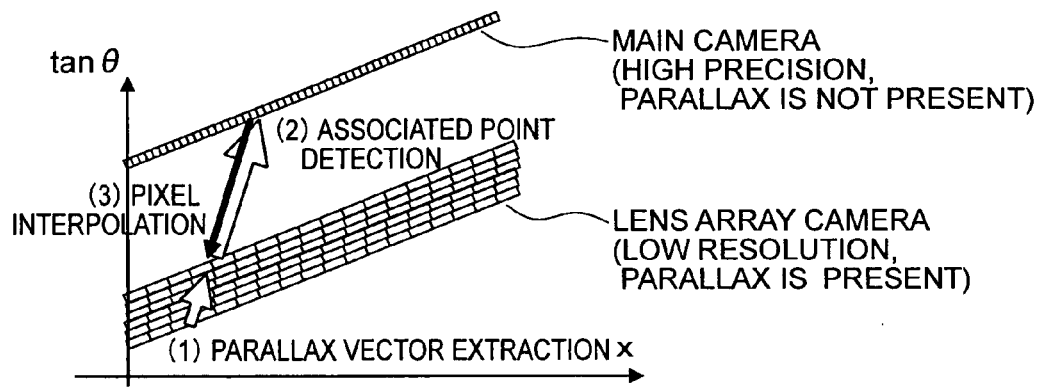
FIG. 25 is a diagram showing parallax vector extraction processing on the light ray space.

A method for extracting a parallax vector from the image acquisition unit 52 which is the lens array camera and the image acquisition unit 51 which is the main camera will now be described. A procedure of the parallax vector extraction processing is shown in FIG. 24, and association of the parallax vector extraction processing with the light ray space is shown in FIG. 25. The parallax vector extraction unit 54a extracts a parallax vector from image data acquired by the image acquisition unit 52 which is the lens array camera, and obtains a parallax vector group (steps S11 and S12 in FIG. 24 and (1) in FIG. 25). And the associated point search unit 54b searches for an associated point of high resolution image data acquired by the image acquisition unit 51 and associated with a parallax vector in the extracted parallax vector group (step S13 in FIG. 24 and (2) in FIG. 25). The parallax vector interpolation unit 54c interpolates and outputs a resolution of an associated low resolution parallax vector by using the high resolution image data at an associated point thus obtained (steps S15 and S16 in FIG. 24 and (3) in FIG. 25). By the way, a parallax vector and a pixel for which an associated point is not obtained are subjected to exception processing as described later (steps S17, S18, S19 and S20).

Concept of Parallax Vector

The parallax vector will now be described. If an object having a depth is viewed from a different angle, the associated pixel location moves. The real space and the parallax vector will now be described with reference to FIG. 26(a). For example, light rays emitted in all directions from a point Q(xq, zq) can be represented as straight lines which pass through various points on the reference plane. A change of the straight line can be represented as the following function.

$$\tan \theta = (x - xq)/zq \quad (14)$$

This function indicates that the pixel location moves because the angle of view θ differs. This function can also be considered to be a velocity vector which represents pixel movement between different parallax images. Here, the movement quantity of the pixel per angle is defined as parallax vector.

Figure 26:
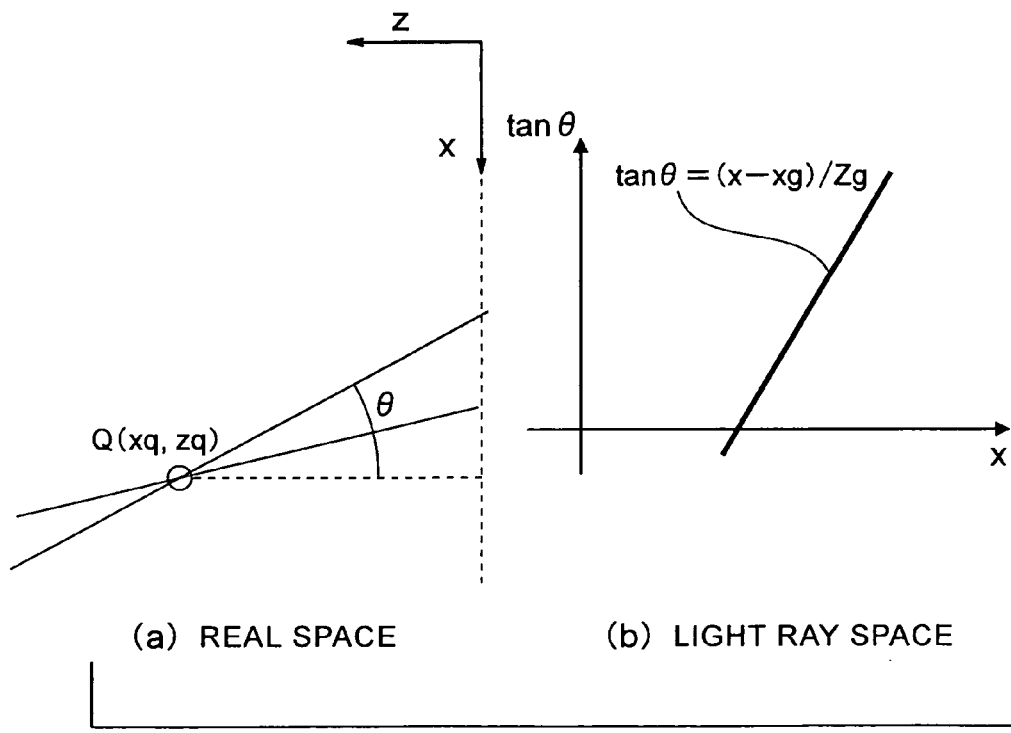
FIGS. 26(a) and 26(b) are diagrams for explaining a parallax vector in the real space and the light ray space.

On the light ray space shown in FIG. 26(b) and defined earlier, the parallax vector can be represented as a straight line having an inclination. This can be appreciated from Expression (14) as well. This movement quantity per angle is an inclination of the straight line, and it is associated with the depth. In the light ray space image as well, a straight line having the same pixel value associated with the depth can be obtained for respective points. It is now supposed that this point is a perfect diffusion plane and the illumination is uniform. At a point having anisotropy in sight according to the angle of view such as on a mirror face or a refraction face, therefore, such a straight line cannot be obtained. Furthermore, it is considered that the luminance is changed by the influence of illumination.

In the present invention, a parallax vector having a predetermined location and angle as a base point and having tan θ and an inclination of x on the space is defined. In the case where the cameras are arranged so as to have a parallax in the horizontal direction and vertical direction, the parallax vector can also be defined as a vector on the three-dimensional space of tan θ, x and y.

Furthermore, a similar vector can be defined for a simple light ray space array as well.

Parallax Vector Extraction of Lens Array Camera

Parallax vector extraction of the lens array camera will now be described. On the basis of optical characteristics of the lens array camera, pixel data are converted to the light ray space or a multiple visual point image and converted to a parallax vector. Broadly divided, the following three methods will now be introduced.

1) Block Matching

An object image is divided into small blocks, and a reference image is scanned from block to block. A location having high correlation between a block and a reference image is found by using a difference in pixel value. A location having high correlation between parallaxes is shifted by performing the block matching with multiple visual point images. The pixel shift quantity (optical flow) of every parallax image (every angle) is a parallax vector, and the center of the object block should be regarded as a base point. If the center of the object block is defined every pixel, then a parallax vector associated with each pixel can be obtained.

2) Clustering

If images on the same y axis are arranged so as to be associated with the light ray space, then associated pixels often form a straight line. It is also possible to recognize the inclination of the straight line as a parallax vector. The inclination of the straight line has a meaning equivalent to a vector of a shift of an associated point having high correlation indicated by 1. As one method for recognizing this straight line, an associated pixel group can be grouped by clustering pixel values (inclusive of a color or the like) in light ray space data obtained by sampling pixels coarsely, making the pixel sampling fine, and consequently increasing the divisions of clustering. Grouped data are a set of high correlation data. A vector extending from a pixel which becomes the reference in the group into a parallax angle direction of grouped data can be obtained as a parallax vector.

3) Parallax Filtering

An inclination of a straight line on the light ray space should be associated. The inclination of the straight line can be obtained by preparing filters capable of detecting inclinations of straight lines respectively and obtaining correlation of light ray space data with the filters on respective points. As a result, a parallax vector is obtained. A filtered center pixel becomes a reference pixel, and an angle having the highest correlation should be regarded as an angle of a parallax vector.

(Addition) Parallax Vector from Correlation Decision

As many parallax vectors as the number of lenses in the lens array are calculated on image data of the lens array camera by using a technique of the 1) block matching, 2) clustering, or 3) parallax filtering. For example, a pixel which becomes the reference is handled as a parallax center in the lens array image, and a parallax vector is associated with every pixel.

Search for Point Associated with Main Camera and Resolution Interpolation of Parallax Vector A point associated with a pixel of the main camera is obtained by using, for example, a pixel value of a parallax vector and the vector obtained using the above-described method. Since there are restrictions in the resolution and parallax quantity of the lens array camera, the parallax vector has a width of some extent. Search is performed on an extension line of the parallax vector inclusive of the vector width, and a point having a pixel value which is the nearest a pixel value the parallax vector has is regarded as an associated point. There are two respects to be noted. A first respect is that the main camera and the lens array camera differ in resolution. A second respect is that all associated points do not always exist. Pixels may be used as they are. As regards the respect that the resolution differs, however, it is also possible to evaluate pixels inclusive of the lens array camera by using an average of neighboring pixels. If an associated point is found, then the width of the parallax vector can be made small because the resolution is increased. In addition, interpolation between pixels of the lens array camera is performed by using pixels of the main camera. In some cases, there is no associated point. Therefore, the nearest pixel is not always given. A certain threshold is provided. If a pixel value does not satisfy a condition concerning the threshold, an associated point is judged not to be present and exception processing is performed.

Figure 27:
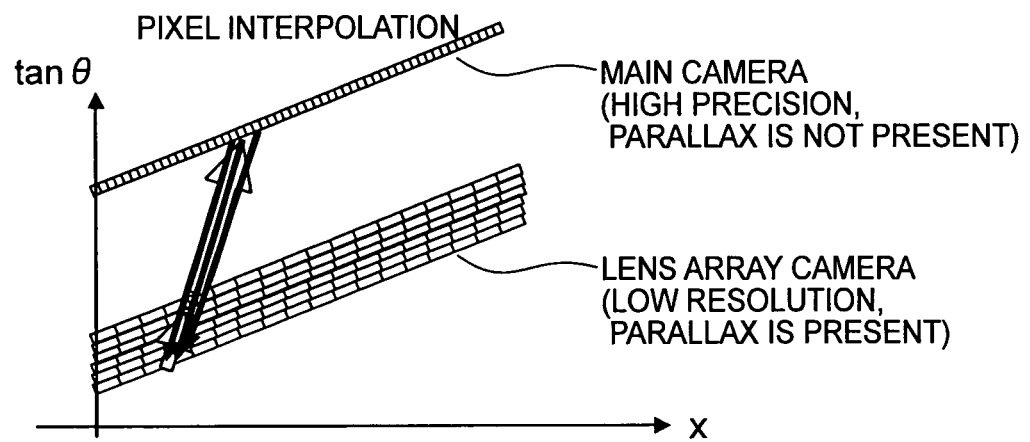
FIG. 27 is a diagram for explaining pixel interpolation processing on the light ray space in the case where there is a corresponding point.

FIG. 27 shows a schematic diagram of parallax interpolation performed when there is an associated point. If an associated point is found, interpolation is performed as a parallax vector having the resolution of the main camera by using pixels of the main camera. In some cases, the difference in pixel between the main camera and the lens array camera represents substance feeling of the object. Therefore, it is also possible to store a difference between them and give pixel values so as to gradually change the luminance value and chromaticity by interpolation between associated points. It becomes possible to further enhance the picture quality by performing calibration of luminance deviation or chromaticity deviation such as an individual difference between cameras. As the concept of the parallax vector, therefore, the parallax vector can be defined inclusive of the change quantity of the pixel value.

Exception Processing in Case where an Associated Point is not Present

Figure 28:
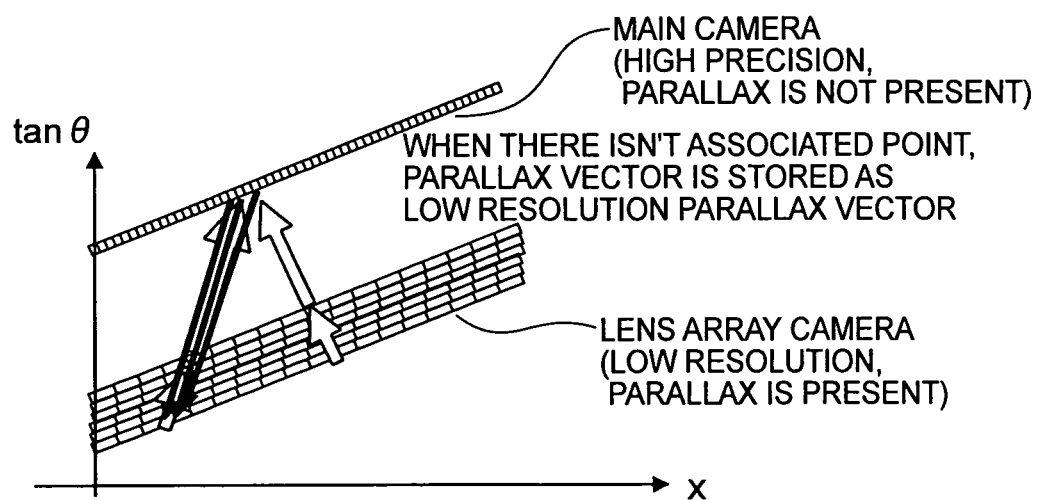
FIG. 28 is a diagram for explaining pixel exception processing on the light ray space in the case where there isn't a corresponding point.
Figure 29A:
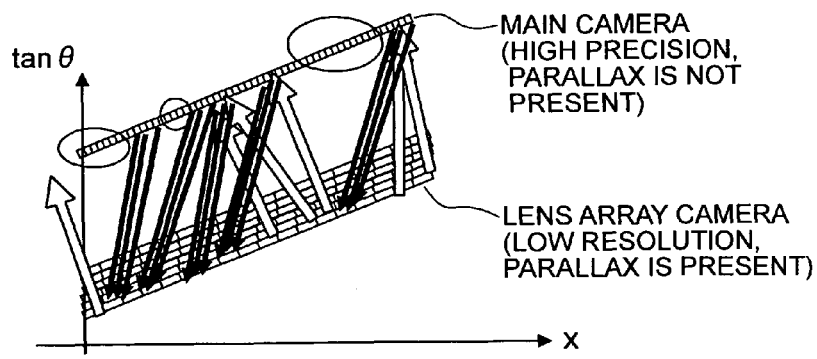
FIGS. 29A to 29C are diagrams for explaining other pixel exception processing on the light ray space in the case where there isn't a corresponding point.
Figure 29B:
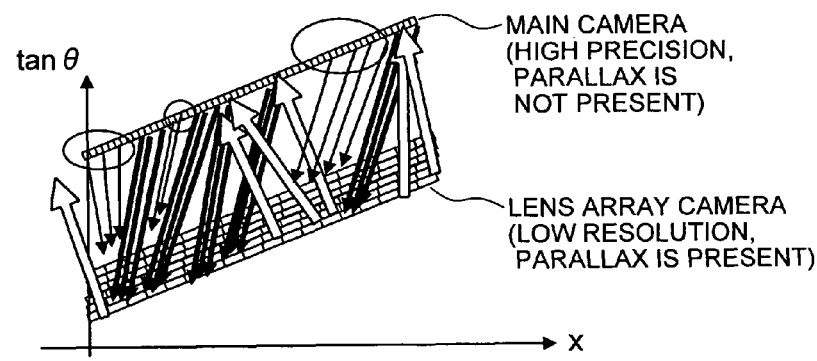
Figure 29C:
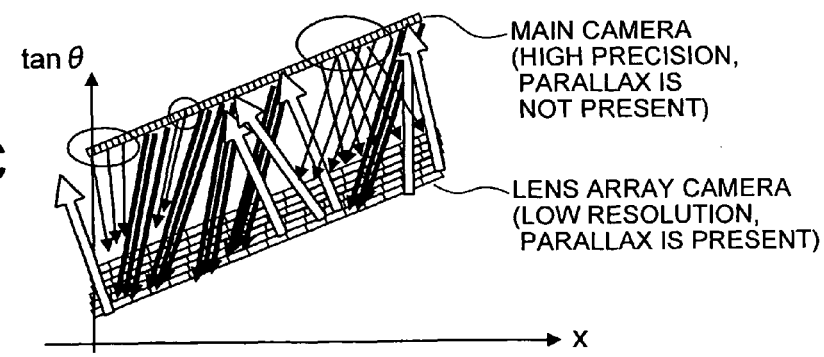

When an associated point is not found in the associated point search processing at the step S13 shown in FIG. 24, classification into two cases: parallax vector or pixel can be performed. If an associated point between the parallax vector obtained by the lens array camera and the main camera is not present as shown in FIG. 28, then the parallax vector obtained by the lens array camera should be stored as it is. It is also possible to divide vectors having the same pixel value in accordance with the resolution of the main camera in order to unify the vector resolution. If there are no associated points in pixels of the main camera as shown in FIGS. 29A, 29B and 29C, then it is conceivable to assign vectors to respective pixels. A provisional parallax vector is given to each pixel by interpolating an angle on the basis of vector information of adjacent parallax vectors (step S19 in FIG. 24). An associated parallax vector of the lens array camera is searched for by using that parallax vector (step S18 in FIG. 24). A decision is made whether an occlusion relation is satisfied, i.e., the provisional vector is located behind the parallax vector searched for, on the basis of the parallax vector searched for (steps S18 and S20 in FIG. 24). The parallax vector (inclination of a line on the light ray space) represents the depth location, and the before-behind relation can be ascertained by comparing inclinations. If there is no associated parallax vector, then the parallax vector in the lens array camera should satisfy the occlusion relation. If the occlusion relation is not satisfied, then a contradiction occurs. If the contradiction has occurred, then the parallax vector is located further behind and re-given, and repetition processing is performed until a vector having no contradiction point is given (steps S18, S19 and S20 in FIG. 24). If there are no contradiction points, a parallax vector is output.

Data Structure of Parallax Vector

The parallax vector has a reference point, a two-dimensional vector on the light ray space, and pixel values (such as R, G and B data). For example, a vector and a pixel value are put into an array associated with a pixel location of the main camera. Furthermore, vectors in the occlusion relation in the main camera and pixel values are put into only necessary parts of an array associated with a pixel location of a parallax center of the lens array camera. And it is conceivable to put in binary data which indicates only a part having pixel data of the lens array camera, the ratio in pixel pitch between the lens array camera and the main camera, and meta data such as the main parallax angle difference together as a header.

Generation of Multiple Visual Point Image

Generation of the multiple visual point image will now be described.

Mesh Data Processing

Figure 30:
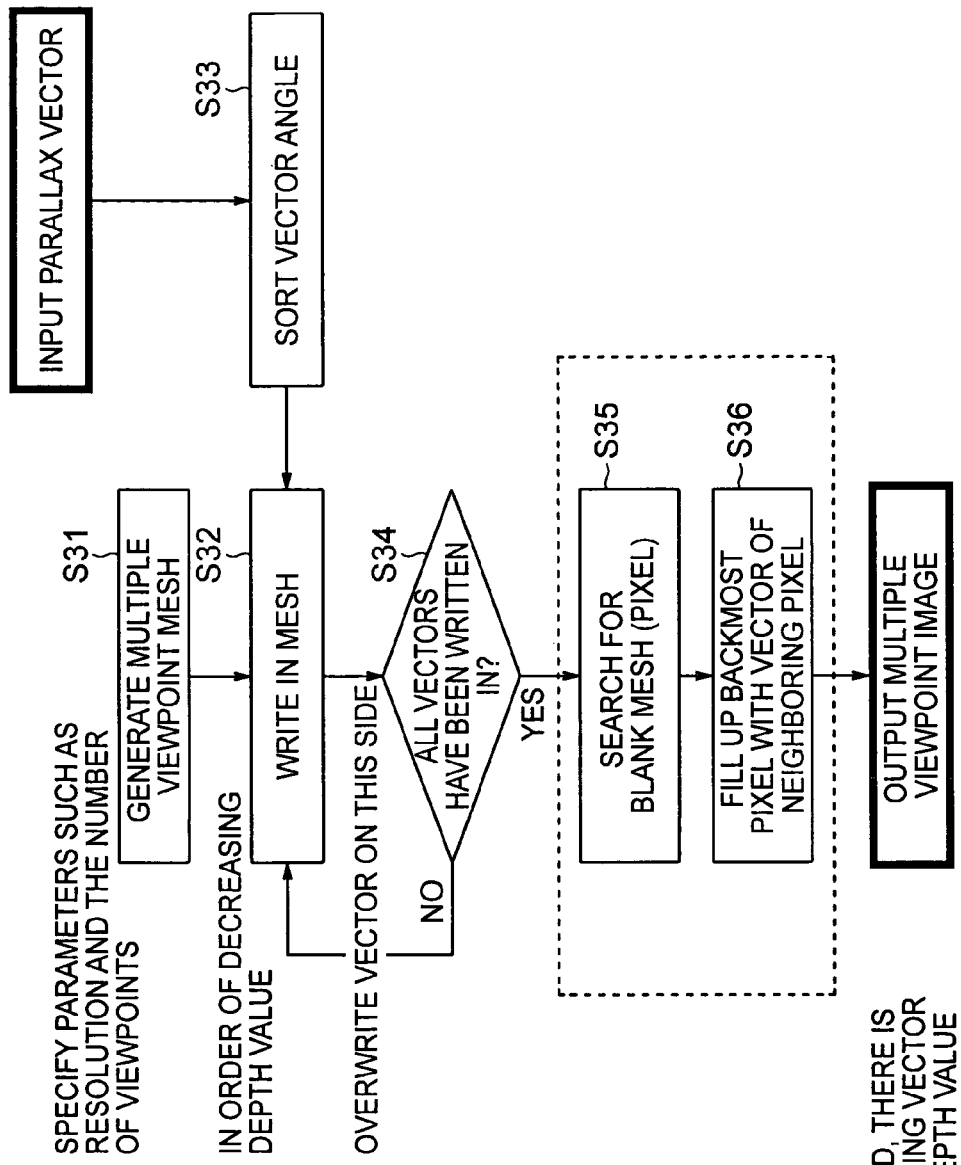
FIG. 30 is a flow chart for explaining a procedure of multiple visual point image generation processing.
Figure 31:
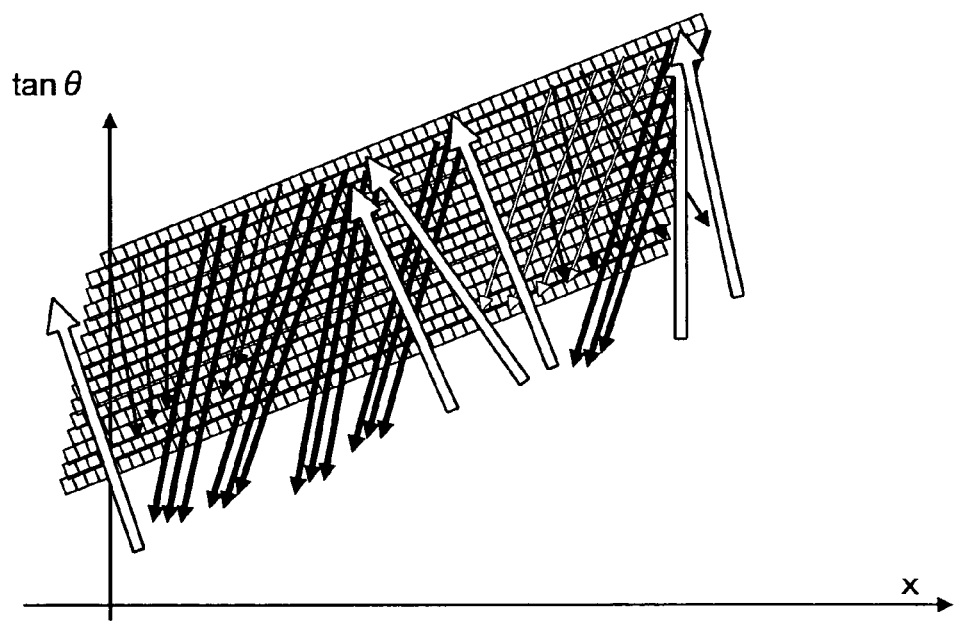
FIG. 31 is a diagram for explaining the multiple visual point image generation processing on the light ray space.

A processing procedure of a concrete example for generating a multiple visual point image is shown in FIG. 27. A schematic diagram of the multiple visual point image processing on the light ray space is shown in FIG. 31. A required mesh of pixels is generated from parameters such as the required resolution of the multiple visual point image, the number of visual points and arrangement of the cameras (step S31 in FIG. 30). It is also possible to specify this mesh regardless of the number of pixels in the main camera and the lens array camera, and pixel values should be determined by the interpolation processing of vector data. Mesh inclination on the light ray space shown in FIG. 31 represents the perspective of the camera. Data with least interpolation and light processing load can be generated by giving the resolution and perspective of the main camera.

(1) Relations between Mesh Cutting and Pixels

The horizontal interval of the horizontal axis on the light ray space is associated with the needed pixel interval, and the number of divisions obtained by cutting the mesh becomes the number of pixels. The data interval of tan θ on the coordinate axis is associated with the interval of the parallax interval of the stereoscopic image display apparatus, and the number of data becomes the number of parallaxes. For example, supposing a stereoscopic image display apparatus in which ten parallaxes are included in ten degrees and the number of displayed horizontal pixels is 800, a mesh in which the longitudinal direction is divided into ten divisions at an interval of 1 degree and the horizontal direction is divided into 800 divisions should be considered.

(2) Writing from Back

An image is generated from the generated parallax vector. In order to generate an image so as not to cause a contradiction of occlusion because of the before-behind relation, pixels are written into the mesh in order beginning with a pixel having a larger depth value (located in the near-side) (steps S32 and S33 in FIG. 30). If such processing is performed, then processing can be performed without considering which should be put in a point on the mesh on which vectors are overlapped. Specifically, inclinations of parallax vectors on the light ray space are sorted, and vectors having inclinations located in further near-side are written in one after another. Even if overlapping points are present, a point written in later and located this side is used as a final pixel (step S34 in FIG. 30).

(3) Blank Processing

Even if all vector data are written in, the possibility that a blank pixel is generated is high in, for example, data between the main camera and the lens array camera. A pixel through which any vector does not pass is filled up with a pixel of the backmost vector in vectors which exist near the pixel (steps S35 and S36 in FIG. 30). By doing so, an image with less occlusion contradiction can be generated.

(4) Expansion Processing of Back Vector

It is considered that the processing becomes heavy by performing blank processing. In order to avoid the blank processing, it is also possible to previously expand a parallax vector having a large depth value and write the parallax vector into the mesh. An expansion coefficient according to the depth value is given, and processing is performed. As a result, a multiple visual point image equivalent to that obtained by performing the blank processing can be generated.

Display, Transmission and Storage (1) Stereoscopic Image Display

If the above-described multiple visual point image can be output, then the stereoscopic image can be reproduced. Details thereof have been already described with reference to the stereoscopic image display apparatus. It is also possible to attach a display panel for stereoscopic display to the stereoscopic image capturing apparatus, and capture while presenting the captured image inclusive of the depth. At this time, processing of converting multiple visual point image data to an image format according to the display and display the image is performed. If the presentation is aimed, then it is conceivable to perform output and storage of the image in a format for stereoscopic display instead of the multiple visual point image data.

(2) Transmission and Coding

Figure 32:
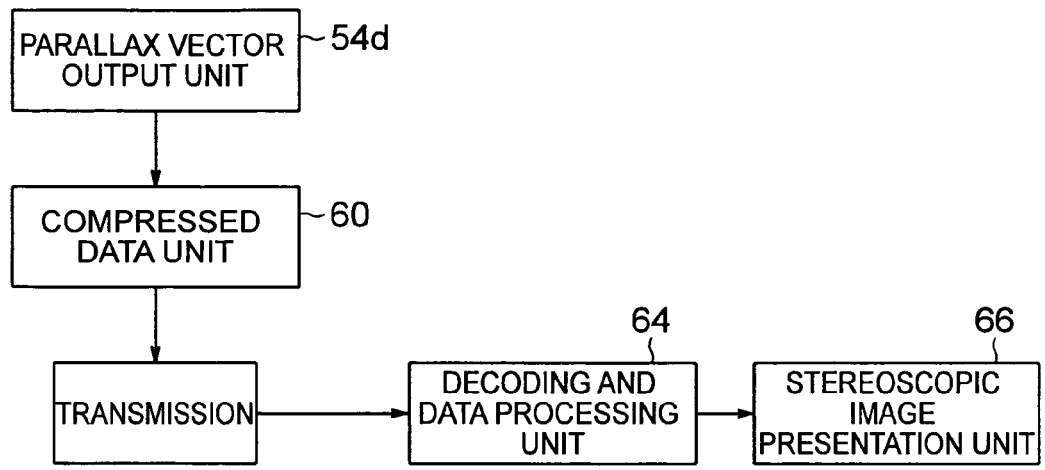
FIG. 32 is a flow chart showing a processing procedure of data transmission.

Coding can be performed in order to perform transmission. FIG. 32 shows a processing flow of data transmission. Although the multiple visual point image for stereoscopic display can also be transmitted, the data quantity becomes large and it is not efficient. Although it is conceivable to use correlation of multiple visual point images, it is a parallax vector obtained in the processing process. A compressed data unit 60 performs coding and compression by using this parallax vector. A decoding and data processing unit 64 at the transmission destination performs decoding and generates a multiple visual point image. A stereoscopic image presentation unit 66 presents a stereoscopic image. As an example of coding, it is also conceivable to give images of the main camera, angles of parallax vectors respectively given to the images, and the change function with respect to the associated point with the resolution of the main camera, and give the pixel value of the vector and the angle of the parallax vector with the resolution of the lens array camera (only a data portion in which an associated point is not obtained). As regards the moving picture, it is possible to consider using motion prediction obtained from preceding frames.

(3) Storage

Figure 33:
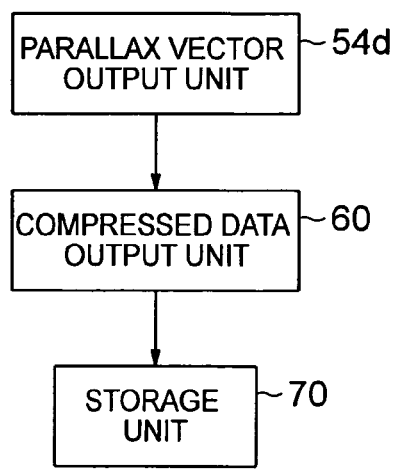
FIG. 33 is a flow chart showing a processing procedure of data retention.

It is also possible not only to transmit but also store data in a data storage (such as tape, a memory, and an HDD). FIG. 33 shows a processing flow of data storage. Compressed data using the parallax vector as the data quantity are efficient in storage. Therefore, a storage unit 70 stores data compressed by the compressed data unit 60. When performing stereoscopic image display, a stereoscopic image should be presented by decoding data stored in the storage unit 70 and generating a multiple visual point image.

According to the embodiments of the present invention, it is possible to capture a stereoscopic image from which a multi-parallax image having a reduced data quantity and a high picture quality can be synthesized, as heretofore described.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A stereoscopic image capturing apparatus comprising:
a first image acquisition unit including a first image formation lens unit which forms an image of an object, and a first image sensor having a plurality of capturing pixels on a surface thereof to receive the image formed by the first image acquisition unit and convert the image to an electric signal;
a second image acquisition unit including a second image formation lens unit which forms an image of the object, a first lens array unit having a plurality of lenses arranged in an array form to receive the image formed by the second image formation lens, and a second image sensor having a plurality of capturing pixels on a surface thereof to receive the formed image through the first lens array unit and convert the image to an electric signal, the second image acquisition unit being disposed at a distance in a horizontal direction from the first image acquisition unit when viewed from the object; and
a parallax vector generation processing unit which performs parallax vector generation processing by extracting a parallax vector from the image acquired by the second image acquisition unit, determining an associated point of the image acquired by the first image acquisition unit and the parallax vector, and interpolating a resolution of the parallax vector using the associated point and the image acquired by the first image acquisition unit.

2. The apparatus according to claim 1, wherein a first straight line coupling a center of the first image formation lens unit to a center of the first image sensor and a second straight line coupling a center of the second image formation lens unit to a center of the second image sensor are respectively perpendicular to the surface of the first image sensor.

3. The apparatus according to claim 1, wherein a first straight line coupling a center of the first image formation lens unit to a center of the first image sensor and a second straight line coupling a center of the second image formation lens unit to a center of the second image sensor are respectively inclined with respect to the surface of the first image sensor.

4. The apparatus according to claim 3, wherein the surface of the first image sensor is inclined to the surface of the second image sensor.

5. The apparatus according to claim 3, wherein the surface of the first image sensor is parallel to the surface of the second image sensor.

6. The apparatus according to claim 1, wherein a distance between a center of the first image sensor and a center of the second image sensor is greater than a distance between a center of the first image formation lens unit and a center of the second image formation lens unit.

7. The apparatus according to claim 1, wherein
the first lens array unit includes a plurality of cylindrical lenses, and extending directions respectively of the cylindrical lenses are vertical with respect to a lower edge of the first lens array unit.

8. The apparatus according to claim 1, wherein the first lens array unit includes a plurality of microlenses arranged in an array form.

9. The apparatus according to claim 1, wherein a lens pitch of the first lens array unit is an integer times a pitch of pixels in the second image sensor.

10. The apparatus according to claim 1, wherein
a focal length of each lens of the first image formation lens unit is equal to a focal length of each lens of the second image formation lens unit, and
a capturing view angle of the first image sensor is equal to a capturing view angle of the second image sensor.

11. The apparatus according to claim 1, further comprising:
a third image acquisition unit including a third image formation lens unit which forms a image of the object, a second lens array unit having a plurality of cylindrical lenses arranged in an array form to receive the image formed by the third image formation lens, and a third image sensor having a plurality of capturing pixels on a surface thereof to receive the formed image through the second lens array unit and convert the image to an electric signal,
wherein
the third image acquisition unit is disposed in a vertical direction with respect to the first image acquisition unit when viewed from the object, and
ridgelines respectively of the cylindrical lenses are arranged in a horizontal direction when viewed from the object.

12. The apparatus according to claim 1, further comprising:
a third image acquisition unit including a third image formation lens unit which forms an image of the object, and a third image sensor having a plurality of capturing pixels on a surface thereof to receive the image formed by the third image formation lens unit and convert the image to an electric signal,
wherein
the third image acquisition unit is disposed in a vertical direction with respect to the first image acquisition unit when viewed from the object.

13. A stereoscopic image capturing system comprising:
a stereoscopic image capturing apparatus according to claim 1;
the parallax vector generation processing unit comprising:
a parallax vector extraction unit which extracts the parallax vector on the basis of the image acquired by the second image acquisition unit;
an associated point search unit which searches for the associated point of the image acquired by the first image acquisition unit and the parallax vector extracted by the parallax vector extraction unit; and
a parallax vector interpolation unit which interpolates the resolution of the parallax vector by using the associated point searched for by the associated point search unit and the image acquired by the first image acquisition unit.

14. The system according to claim 13, wherein the parallax vector generation processing unit comprises:
a first parallax vector presumption unit which presumes and assigns a parallax vector located near a pixel for which an associated point in the image has not been obtained by the associated point search unit, as a parallax vector;
a contradiction decision unit which makes a decision whether there is a contradiction between the parallax vector extracted by the parallax vector extraction unit and the parallax vector presumed by the first parallax vector presumption unit; and
a second parallax vector presumption unit responsive to the contradiction to presume a non-contradictory parallax vector having a greater depth value and assign the presumed parallax vector to the pixel.

15. The system according to claim 13, further comprising a light ray space conversion unit which converts image information of pixels in the first and second image sensors associated with respective locations and angles to a data disposed in a light ray space, by using an imaging plane of a supposed viewing distance as a reference plane.

16. The system according to claim 13, further comprising a multiple visual point image generation unit which generates a multiple visual point image formed of a given number of visual points and a given number of pixels by using the parallax vector generated by the parallax vector generation processing unit.

17. The system according to claim 16, wherein the multiple visual point image generation unit generates a multiple visual point image by writing in a pixel of a parallax vector on a back side and overwriting pixels on a front side.

18. The system according to claim 16, wherein the multiple visual point image generation unit searches pixels of the multiple visual point for a blank pixel on the basis of the parallax vector generated by the parallax vector generation processing unit, and fills up the blank pixel with a pixel value of a parallax vector having a greatest depth value located near the blank pixel.

19. The system according to claim 16, wherein the multipoint view image generation unit expands a parallax vector having a greater depth value, in proportion to the depth value.

20. The system according to claim 13, further comprising:
a stereoscopic image conversion unit which converts a multiple visual point image generated by the multiple visual point image generation unit to stereoscopic image data required for stereoscopic display; and
a stereoscopic display unit which displays the stereoscopic image data.

* * * * *